(12) United States Patent
Cao

(10) Patent No.: US 8,176,748 B2
(45) Date of Patent: May 15, 2012

(54) CAO HEAT ENGINE AND REFRIGERATOR

(76) Inventor: Yiding Cao, Miami, FL (US)

( * ) Notice: Subject to any disclaimer, the term of this patent is extended or adjusted under 35 U.S.C. 154(b) by 243 days.

(21) Appl. No.: 12/587,275

(22) Filed: Oct. 5, 2009

(65) Prior Publication Data
US 2010/0089062 A1    Apr. 15, 2010

Related U.S. Application Data

(63) Continuation of application No. 11/888,982, filed on Aug. 4, 2007, now Pat. No. 7,784,300.

(60) Provisional application No. 61/195,283, filed on Oct. 6, 2008.

(51) Int. Cl.
*F25D 9/00*    (2006.01)

(52) U.S. Cl. ......................................... 62/401

(58) Field of Classification Search ............ 62/401; 60/641.8, 682; 418/61.2, 83; 123/2; 165/121
See application file for complete search history.

(56) References Cited

U.S. PATENT DOCUMENTS

| | | | | |
|---|---|---|---|---|
| 4,353,337 A * | 10/1982 | Rosaen | ........ | 123/243 |
| 5,049,052 A * | 9/1991 | Aihara | ........ | 418/179 |
| 5,410,998 A * | 5/1995 | Paul et al. | ........ | 123/204 |
| 5,540,199 A * | 7/1996 | Penn | ........ | 123/243 |
| 6,536,403 B1 * | 3/2003 | Elsherbini | ........ | 123/243 |

* cited by examiner

*Primary Examiner* — Melvin Jones

(57) ABSTRACT

This invention provides heat engines based on various structures of internal combustion engines, such as a four-stroke piston-type combustion engine, two-stroke piston-type combustion engine, rotary combustion engine, or a free-piston type combustion engine. Said heat engine is provided with at least a heating chamber per piston or rotor, a heat exchanger unit disposed within said heating chamber through which thermal energy is extracted from a heat source and at least a port leading to a working chamber space from said heating chamber, and has a significantly increased heat transfer duration from the heat source to the working fluid within said heating chamber without increasing the number of strokes per power stroke in a cycle. Additionally, said heat engine is provided with an over expansion mechanism in conjunction with a compression means for intake charge. Thereby many of the operational characteristics of an Otto power cycle may be attained in said heat engine, and a heat source with a. relatively low temperature may be accommodated through the combination of a lower compression ratio, the over expansion mechanism, and the boost of the intake charge.

12 Claims, 10 Drawing Sheets

CAO HEAT ENGINE AND REFRIGERATOR

CROSS REFERENCES TO RELATED APPLICATIONS

This application is a continuation of application Ser. No. 11/888,982 filed Aug. 4, 2007 now U.S. Pat. No. 7,784,300, and provisional patent application No. 61/195,283 filed Oct. 6, 2008.

FIELD OF INVENTION

This invention relates to heat engines that converts thermal energy from a heat source into mechanical work and relates to corresponding refrigerators having a reversed operation of the heat engines, in particular using a gas as the working fluid.

BACKGROUND

A heat engine is an energy system that performs conversion of thermal energy from an energy source or heat reservoir to mechanical work. A variety of energy sources may be employed to power the heat engine. These energy sources may include, but not limited to, solar energy, nuclear energy, geothermal energy, combustion gas from a combustion chamber, exhaust gas from a diesel engine, gasoline engine, or gas turbine engine, and flue gases and hot fluids from industrial furnaces or processes. According to one classic definition, a heat engine employs a working fluid without the change of chemical composition and works in cycles with the options of having an open-cycle or a closed-cycle configuration.

Unlike a heat engine according to the above classic definition, an internal combustion engine, strictly speaking, does not work in cycles due to the change in chemical composition of the working fluid. Traditionally, however, the operation of an internal combustion engine may be simplified as cycles for the convenience of analysis. In this regard, the chemical energy associated with a fuel is converted into thermal energy through combustion, and the thermal energy released during combustion is absorbed by the compressed working fluid over a certain time period in a cycle. This time period may be measured in terms of crank angle (CA) or drive shaft rotating angle. As a result, the thermal energy released in the combustion and absorbed by the working fluid in a cycle may be expressed by the following relation:

$$Q_c = \int_{\theta_s}^{\theta_e} \dot{Q}_c(\theta) d\theta = \bar{Q}_c(\theta_e - \theta_s) = \bar{Q}_c \Delta\theta_c \qquad (1)$$

wherein $\dot{Q}_c$ is the instantaneous combustion heat release rate and $\bar{Q}_c$ is the average heat release rate over the combustion duration, both having a unit of J/CA, $\theta_s$ is the crank angle at which combustion starts in the combustion chamber, $\theta_e$ is the crank angle at which the combustion ends, and $\Delta\theta_c$ is the combustion duration in CA degrees. Due to the explosive nature of combustion in a combustion chamber and a high average heat release rate, $\bar{Q}_c$, the combustion duration is normally very small, on the order of 30-40 CA.

For a heat engine, the acquisition of the thermal energy by the working fluid from an external heat source is normally through a heat exchanger that facilitates heat transfer from the heat source to the working fluid due to a temperature difference between the heat source and the working fluid. This heat transfer may occur during a time period in a cycle, which could also be measured through a crank angle (or drive shaft rotating angle):

$$Q_{HT} = \int_{\theta_1}^{\theta_2} \dot{Q}_{HT}(\theta) d\theta = \bar{Q}_{HT}(\theta_2 - \theta_1) = \bar{Q}_{HT} \Delta\theta_{HT} \qquad (2)$$

wherein $\dot{Q}_{HT}$ is the instantaneous heat transfer rate and $\bar{Q}_{HT}$ is the average heat transfer rate over the heat transfer duration, both having a unit of J/CA, $\theta_1$ is the crank angle at which the heat transfer begins, $\theta_2$ is the crank angle at which the heat transfer ends, and $\Delta\theta_{HT}$ is the effective heat transfer duration in degrees of CA.

It is well known that the heat absorbed by the working fluid in a cycle, either $Q_c$ or $Q_{HT}$, may predominantly determine the power output of an engine at a given engine speed. To match the amount of heat transfer, $Q_{HT}$, in a heat engine with the amount of heat released, $Q_c$, in an internal combustion engine over a cycle, $$Q_{HT} = \bar{Q}_{HT} \Delta\theta_{HT} \approx Q_c = \bar{Q}_c \Delta\theta_c \qquad (3)$$

one way is to provide an average heat transfer rate, $\bar{Q}_{HT}$, having the same order of magnitude as $\bar{Q}_c$. This may be attained through a heat exchanger having a large heat transfer surface area or a high heat transfer rate per unit surface area (heat flux), which is primarily determined by the heat transfer mechanism between the heat source and working fluid of the heat engine as well as the temperature difference between the heat source and working fluid.

In many applications, however, the effective average heat transfer rate, $\bar{Q}_{HT}$, in a heat engine may be at least an order of magnitude lower than the average heat release rate of an internal combustion engine, $\bar{Q}_c$, with a comparable engine size. Thus, another way as shown Eq. (3) is to provide a much longer duration of heat transfer, $\Delta\theta_{HT}$, than the heat release duration, $\Delta\theta_c$, to attain a sufficiently high $Q_{HT}$ for building a heat engine that could be practically viable.

The timing of heat transfer or heat release is also an important issue that must be addressed. In an internal combustion engine operating under the principle of an Otto cycle, the timing of the heat release may be easily controlled, and is preferably set near the top dead center in a piston-type combustion engine for a higher power output and a higher thermal efficiency. For a heat engine, however, the timing of the heat transfer through a heat exchanger may be difficult to control, and in many situations, this heat transfer may inevitably take place over the entire cycle not just near the top dead center, due to thermal inertia factors, such as that related to the mass of the heat exchanger walls. Thus, the increased heat transfer duration as mentioned above may be preferably a time period between after the working fluid is substantially compressed to a higher pressure and before the working fluid has substantially expanded, so that a substantially large portion of the heat acquisition from a heat source in a cycle may occur during this time period and the performance of the heat engine may approach that of an Otto cycle.

It is also well known that for an engine operating at a given speed, both the power output and thermal efficiency may depend on the number of strokes per power stroke in a cycle. For a given heat input in a cycle and a given operating speed, a smaller number of strokes per power stroke will have the benefits of increased power output as well as increased thermal efficiency due to a reduced frictional loss. Thus, it is very important that an increase in the duration of heat transfer not result in an increase in the number of strokes per power stroke in the cycle.

As indicated above, a heat engine may share some similarity with a combustion engine. Thus, a heat engine may be constructed based on the structure of a conventional internal combustion engine such as, but not limited to, four-stroke piston combustion engine, two-stroke piston combustion engine, rotary combustion engine, or free piston combustion engine. Both the two-stroke piston engine and rotary engine may be attractive because of their smaller number of strokes per power stroke in a cycle. Additionally, a heat engine may have a larger size and lower mean effective pressure in comparison with an internal combustion engine of comparable power output. Thus, the working fluid of the heat engine may be pressurized, and a heat engine structure that has a smaller volume-to-power ratio and lower mechanical frictional losses would be preferable.

One of such engine structures may be related to a rotary engine, in particular rotary lobed combustion engine, such as the Wankel rotary engine. In addition to the standard Wankel rotary engine structure as being known today, Wankel's study on rotor and housing configurations covered a range of shapes from a two-lobed rotor in an ovoid-like housing up to a four lobed rotor in a three lobed housing. His original rotary engines were DKM series, in which unlike the standard Wankel rotary engine, the outer rotor is the driven member and turns three times for every two turns of the inner rotor.

It is well known that a rotary engine may have the potential to attain a lower volume-to-power ratio as compared to many other types of engines. Additionally, the motions of the engine components in a rotary engine are substantially rotational, and the reciprocating motion associated with a piston-type engine, which may result in a large portion of frictional losses in the engine, may be substantially removed. Thus, a heat engine based on the structure of a rotary engine may have the potential to minimize the frictional losses. For these and other reasons, a rotary-type heat engine will first be employed to illustrate the embodiment of the present invention, although other types of heat engines such as a piston type will have their own advantages and are equally important to this invention.

Additionally, because of the nature of heat acquisition by the working fluid through a heat exchanger, a heat engine may face a serous dilemma. To receive a larger amount of heat from a heat source for an increased power output of the engine, a lower working fluid temperature at the end of compression is preferred, which may demand a lower compression ratio. However, this lower compression ratio may result in a lower thermal efficiency of the heat engine, which may reduce the energy utilization rate from the heat source and at the same time also have a negative effect on the power output of the engine.

A refrigerator is a system that lowers the temperature of a space or substance and then maintains that lowered temperature, and its operation may be considered the reversed operation of a heat engine. Historically, the predominant type of refrigeration system is the vapor-compression refrigeration system. However, it is well known that many refrigerants used in vapor-compression refrigeration systems may have a negative environmental impact on global warming. A refrigeration system using a gas as the working fluid without the change of phase is called the gas refrigeration system and operates on a gas refrigeration cycle. Regardless of a closed-cycle configuration or an open-cycle configuration, a gas refrigeration cycle may include three essential processes. The first process is the compression process in which the intake working fluid is compressed to a higher temperature normally above the ambient temperature, consuming an amount of work from a power source. The second process is the heat removal process in which an amount of heat is transferred from the working fluid to a heat sink, normally the ambient, due to its above-ambient temperature after the compression, lowering its temperature. The third process is the expansion process in which the working fluid returns an amount of work to the system during the expansion and at the same time further lowers its temperature, normally to a temperature below the ambient temperature as the cooled working fluid output. Similar to the discussions above related to a heat engine, a preferred gas refrigeration cycle may have the characteristics of an increased heat removal rate or duration without increasing the number of strokes per discharge stroke of the cooled working fluid in a cycle. Additionally, cooling the working fluid during the compression process could also significantly increase the efficiency of the refrigerator.

As may be known to those skilled in the art, a gas refrigeration system may have the disadvantages of an increased size and a higher mechanical frictional losses as compared to a vapor-compression refrigeration system utilizing evaporation/condensation phase-change processes for heat absorption and removal. As such, a rotary structure may be particularly attractive to a gas refrigeration system because of its potential of having a smaller volume to cooling-load ratio as well as lower mechanical friction losses. For these reasons and others, a rotary type of gas refrigeration system will first be employed to illustrate the embodiment of the present invention, although other types of gas refrigeration systems such as a piston type will have their own advantages and are equally important to this invention.

SUMMARY OF THE INVENTION

It is therefore an objective of this invention to provide a heat engine using a gas as the working fluid and having a significantly increased heat transfer duration from a heat source to the working fluid without increasing the number of strokes per power stroke in a cycle. Said engine may be constructed based on the structure of a conventional combustion engine, such as a four-stroke piston-type combustion engine, a two-stroke piston-type combustion engine, a rotary combustion engine, or a free-piston type combustion engine. The heat engine is provided with at least a heating chamber per piston or rotor. Each said heating chamber has a heat exchanger unit disposed therewithin, and at least a port leading to a working chamber. Associated with said port a heating-chamber valve may be provided, which may open or close said port to establish or block the flow of the working fluid between said heating chamber and working chamber. Thereby the heat transfer duration is substantially increased between the working fluid and the heat source without increasing the number of strokes per power stroke in a cycle, and thereby many of the operational characteristics of an Otto power cycle may be attained in said heat engine and a sufficiently large power output with a reasonably high thermal efficiency may be achieved for the heat engine disclosed herein.

Another major objective of this invention is to provide a refrigerator using a gas or a two-phase mixture as the working fluid based on the basic structures of the various heat engines disclosed in this invention. The invention combines the compression functionality of a compressor and the expansion functionality of a turbine in an air cycle machine into a single refrigerator unit having a cooling means during the compression process. The invention also provides a significantly increased heat removal rate or duration before the expansion stroke to reduce the temperature of the working fluid without increasing the number of strokes per discharge stroke of the cooled working fluid in a cycle. In a preferred embodiment, said refrigerator is provided with at least a cooling chamber per piston or rotor. Each said cooling chamber has a heat exchanger unit disposed therewithin, and at least a port leading to a working chamber space. Associated with said port, a cooling-chamber valve may be provided, which may open or close said port to establish or block the flow of the working fluid between said cooling chamber and working chamber. Thereby the heat removal duration from the working fluid to a heat sink is substantially increased without increasing the number of strokes per discharge stroke of the cooled working fluid in a cycle, and thereby a sufficiently large cooling load with a reasonably high coefficient of performance may be achieved for the refrigerator disclosed herein.

Yet another objective of this invention is to provide a heat engine having a greater expansion ratio than the compression ratio. Said engine may incorporate a compression means such as a supercharger or turbocharger with an after cooler to accommodate the increased expansion ratio and to increase the power output of the engine while maintaining a relatively high thermal efficiency.

A further objective of this invention is to provide a refrigerator having a greater expansion ratio than the compression ratio. Said refrigerator may incorporate a compression means to accommodate the increased expansion ratio and to increase the coefficient of performance and the cooling load of the refrigerator.

In an embodiment associated with a heat engine, said heat engine based on the structure of a rotary engine or a piston engine may have a substantially increased heat transfer rate between the gaseous working fluid and the heat source through the employment of a heat pipe heat exchanger or a rotary regenerator.

In an embodiment associate with a refrigerator, said refrigerator based on the structure of a rotary heat engine or a piston heat engine may have a substantially increased heat removal rate between the working fluid and the heat sink through the employment of a heat pipe exchanger or a rotary regenerator.

DETAILED DESCRIPTION

A rotary engine is an engine that may reproduce thermodynamic cycles of a piston-type combustion engine using a rotor instead of a reciprocating piston. One of the most well known rotary engines in use today is the Wankel-type rotary engine or Mazda rotary engine. The Wankel engine may reproduce the four strokes of the Otto engine or diesel engine using a triangular-like rotor moving around a nearly elliptical (epitrochoid) stationary housing. The combination of the eccentric shaft and "timing" gears causes the rotor to move around the housing with the three tips of the rotor being kept in contact with the side of the housing. The path that the rotor tips follow forms three separate working chambers between the three working faces of the rotor and the side of housing, whose volumes are constantly changing. Each of the three working chambers associated with a respective working face of the rotor may undergo a cycle including an intake stroke (or intake stage), a compression stroke (or compression stage), a power stroke (or power stage), and an exhaust stroke (or exhaust stage) corresponding to the four strokes of the Otto cycle in a piston engine. Accordingly, the working fluid associated with each working chamber would undergo a sequence of intake, compression, ignition (or fuel injection) and burning, expansion, and exhaust.

For a standard Wankel rotary engine or Mazda rotary engine, the shape of the engine housing may be a two lobed epitrochoid. As the output shaft is driven at three times the rotor speed and the rotor has three power strokes (or combustion strokes) per revolution, this becomes one combustion stroke per revolution of the drive shaft, which is equivalent to the situation of a two-stroke piston engine. In the following embodiment, a heat engine based on the structure of a conventional rotary combustion engine but without a combustion chamber is disclosed.

Figure 1:
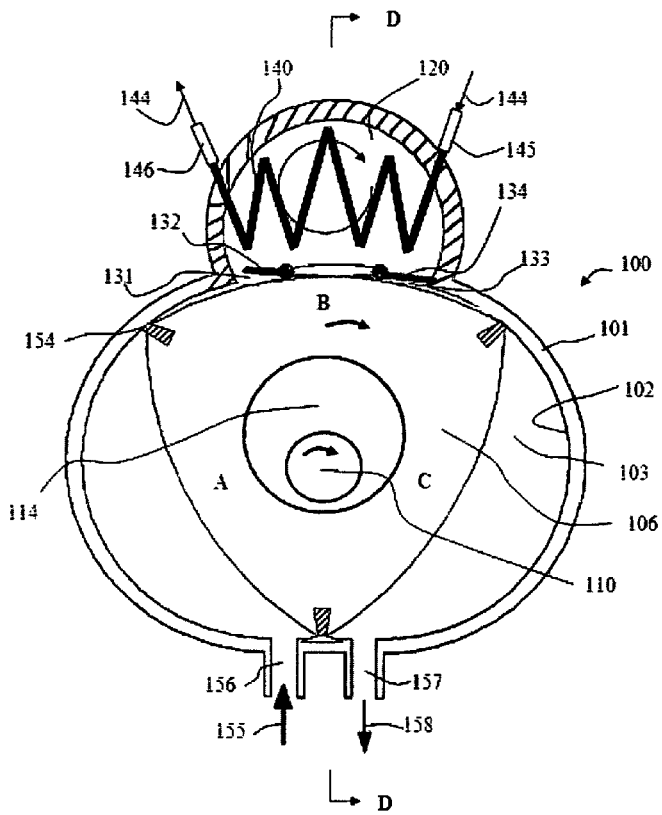
FIG. 1 is a schematic, transverse sectional view of a rotary heat engine in accordance with the present invention showing the first heating chamber and rotor position, wherein the rotor face B has nearly completed the compression stroke associated with the first heating chamber.
Figure 2:
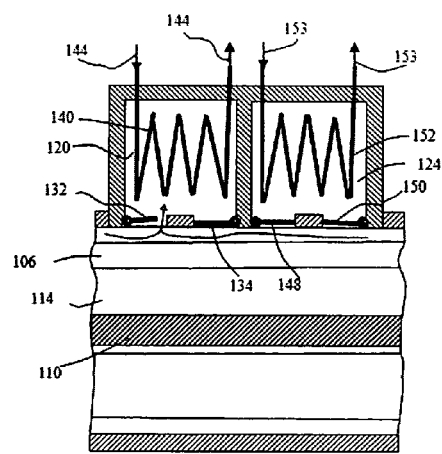
FIG. 2 is a schematic, axial sectional view of a rotary heat engine having two heating chambers per rotor, with a purpose of showing the two heating chambers as well as the positions of the chamber valves associated with the two heating chambers.

Referring now to FIG. 1, there is shown a sectioned view of a rotary heat engine 100 having a two heating-chamber configuration according to an exemplary embodiment of the present invention, and FIG. 2 is an axial sectional view in the direction D-D of FIG. 1. The engine 100 comprises an outer body (or housing) 101 with an inner surface 102 defining an engine cavity or working chamber 103 and surrounding a rotor 106. The inner surface 102 may be a two lobed epitrochoidal surface commonly used in rotary combustion engines, and the rotor 106 is mounted on an eccentric drive shaft 110 having an offset lobe 114 passing through the rotor 106. The rotor 106 is defined by a plurality of rotor faces converging to a plurality of angularly spaced rotor tips 154, each may be provided with a seal slidably engaging the inner surface 102 during the operation of the engine.

Figure 2A:
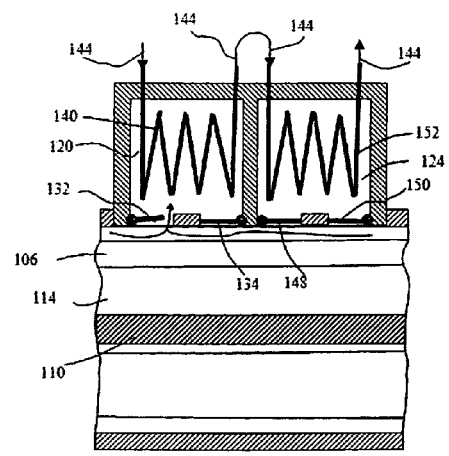
FIG. 2a is a schematic, axial sectional view of a rotary heat engine having two heating chambers per rotor, wherein the heating fluid exiting the heat exchanger in the first heating chamber is directed to the inlet of the heat exchanger in the second heating chamber.

A first heating chamber 120 (FIG. 1) and a second heating chamber 124 (FIG. 2) may be disposed at the outer body 101 illustratively in a position generally corresponding to a spark plug (or spark plugs) or a fuel injector (or fuel injectors) of a conventional rotary combustion engine, and may be arranged in an axial direction of the outer body 101, as seen in FIGS. 1 and 2. The heating chamber 120 is provided with two opening ports 131 and 133 in communication with the working chamber space such as 103 formed between the inner surface 102 and the outer surfaces of the rotor 106 (Said two opening ports may be referred to as compression and expansion ports, respectively, as will be seen later), two heating chamber valves 132 and 134, respectively, associated with the two opening ports, which may block or establish the fluid flow between the heating chamber 120 and the working chamber (alternatively, each port may be an opening in a valve member or the two ports may be two openings in a single valve member, not shown), and a heat exchanger unit 140, wherein a heating fluid 144 flows into the heat exchanger unit through an inlet conduit 145 and flows out of the heat exchanger unit through an outlet conduit 146. Similarly, the second heating chamber 124 is provided with two heating chamber valves, 148 and 150, and a heat exchanger unit 152 with a heating fluid 153 flowing through the heat exchanger unit 152, as shown in FIG. 2. It should be emphasized that FIG. 2 is schematic in nature with a purpose of illustrating the positions of chamber valves, which may not correspond to the position as shown in FIG. 1. Alternatively, the heating fluid 144 and heating fluid 153 may be serially arranged as shown in FIG. 2a, wherein the heating fluid 144 exiting the heat exchanger 140 in the first heating chamber is directed to the inlet of the heat exchanger 152 in the second heating chamber.

As will be discussed later, the number of the heating chambers per rotor or piston may be reduced to one, or the number of the opening ports or heating chamber valves per heating chamber may be reduced to one or zero, depending on specific applications. Particularly, one opening port with a valve per heating chamber may be employed for a simpler structure, but with certain operational disadvantages.

The three rotor tip seals 154 as shown in FIG. 1 divide the engine chamber into three sub-working chambers. Each is formed between a respective rotor face, such as A, B, or C, and the inner surface 102 (For brevity, a sub-working chamber associated with a rotor face will be referred to as the working chamber of that face), and undergoes a different phase of a four-stroke engine. In FIG. 1, the working chamber A (associated with rotor face A) is open to an intake port 156 and a gaseous charge 155, such as air, is being drawn into the working chamber. The working chamber C has just opened a discharge port 157 and expanded working fluid 158 is being discharged out of the engine. The working chamber B has nearly finished the compression stroke and most of the working fluid in the working camber has been compressed into the first heating chamber 120, while chamber valve 132 is in a process of being closed. Before the first heating chamber is closed, the second heating chamber 124 is largely closed, enclosing an amount of working fluid entering the second heating chamber during the last cycle, and the enclosed working fluid is heated by the heating fluid 153 through the heat exchanger unit 152 (FIG. 2). Because the compression stroke associated with the first heating chamber 120 is nearly completed, the chamber valve 150 associated with the second heating chamber is in a process of being opened.

Figure 3:
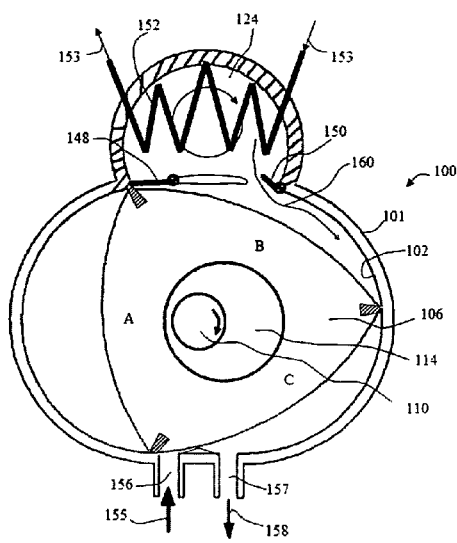
FIG. 3 is a schematic, transverse sectional view of a rotary heat engine showing the second heating chamber and rotor position, wherein working fluid expands from the second heating chamber into the working chamber B, delivering work to the rotor.

Turning now to FIG. 3, there are shown rotor positions and the second heating chamber 124, wherein the working chamber A is near its peak volume, the intake port 156 has nearly been closed, and through the discharge port 157 the expanded working fluid is being forced out of the working chamber C. The chamber valve 150 associated with the right-side opening of the second heating chamber 124 has been opened, and higher temperature, higher pressure working fluid 160 expands from the second heating chamber into the working chamber B, delivering work to the rotor. At the same time, both the chamber valves 132 and 134 associated with the first heating chamber 120 are closed, enclosing the working fluid entering the first heating chamber earlier, and the enclosed the working fluid is being heated by the heating fluid 144 through heat exchanger 120 (not shown).

Figure 4:
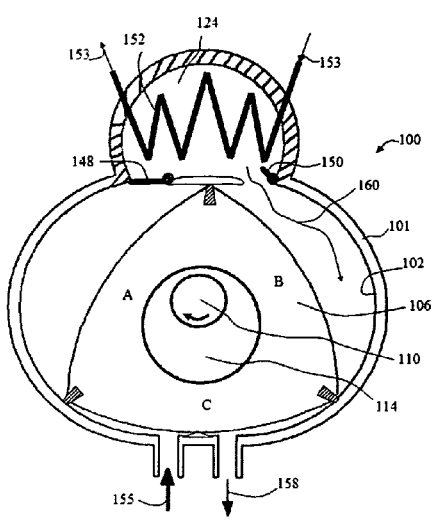
FIG. 4 is a schematic, transverse sectional view of a rotary heat engine showing the second heating chamber and rotor position, wherein the working fluid from the second heating chamber continues to expand against rotor face B.

Turning now to FIG. 4, there are shown rotor positions and the second heating chamber 124, wherein the working fluid from the second heating chamber 124 continue to expand against rotor face B, the compression stroke associated with the working chamber A has begun and the left-side chamber valve 148 is about to open for admitting working fluid into the second heating chamber 124, and the working chamber C has nearly finished the discharge stroke and is about to start a new intake stroke. At the same time, the first heating chamber 120 remains closed and the working fluid enclosed continues to be heated (not shown).

Figure 5:
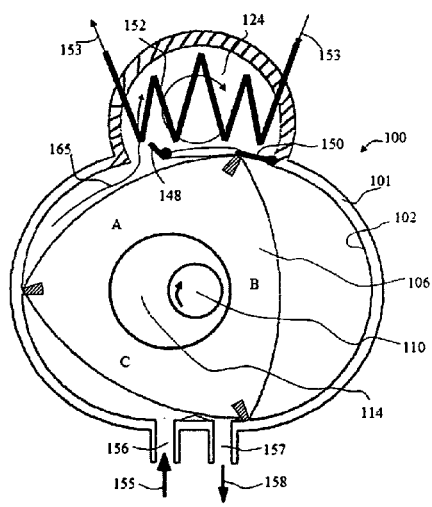
FIG. 5 is a schematic, transverse sectional view of a rotary heat engine showing the second heating chamber and rotor position, wherein the expansion stroke associated with the working chamber B has nearly completed, and working fluid is being compressed into the second heating chamber from working chamber A.

Turning now to FIG. 5, there are shown rotor positions and the second heating chamber 124, wherein the expansion stroke associated with working chamber B has nearly completed while the chamber valve 150 has closed the right-side port, the second heating chamber 124 has already opened to working chamber A, admitting compressed working fluid 165 from the working chamber A, and the working chamber C is continuing its intake stroke. At the same time, the first heating chamber 120 remains closed and the working fluid enclosed continues to be heated (not shown). One skilled in the art may recognize that the working fluid in both the working chamber B and the second heating chamber may have a higher temperature or pressure than that of the ambient before the discharge port is opened. Thus, it would be beneficial for both the heating chamber and working chamber B to experience a blown down process that is commonly employed in a conventional international combustion engine. This blow down process may be achieved through the design of the discharge port in conjunction with a late closing of valve 150 or a late opening of valve 148 until the discharge port 157 is opened (not shown).

Figure 6:
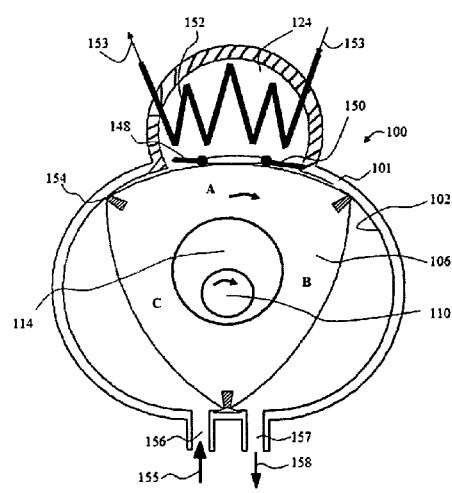
FIG. 6 is a schematic, transverse sectional view of a rotary heat engine showing the second heating chamber and rotor position, wherein the working chamber A has nearly reached its maximum compression into the second heating chamber and the second heating chamber is about to be closed.

Turning now to FIG. 6, there are shown rotor positions and the second heating chamber 124, wherein the working chamber A has nearly reached its maximum compression into the second heating chamber while the second heating chamber is about to be closed through the closing of the chamber valve 148, the working chamber C continues to draw fresh charge into the working chamber, and the working chamber B has just opened the discharge port. At the same time, the first heating chamber 120 is about to open for an expansion stroke (not shown).

Figure 7:
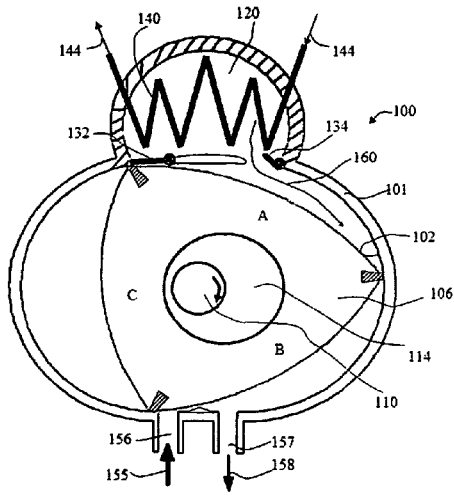
FIG. 7 is a schematic, transverse sectional view of a rotary heat engine showing the first heating chamber and rotor position, wherein working fluid expands from the first heating chamber into the working chamber A, delivering work to the rotor.

Turning now to FIG. 7, there are shown rotor positions and the first heating chamber 120, wherein the chamber valve 134 has opened, and higher temperature, higher pressure working fluid 160 expands from the first heating chamber into the chamber A, driving rotor face A and delivering work to the rotor, the working chamber B is discharging its expanded working fluid out of the working chamber, and the working chamber C is near its peak volume and the intake port has nearly been closed. At the same time, both the chamber valves 148 and 150 associated with the second heating chamber 124 are closed, enclosing the working fluid entering the second heating chamber earlier, and the enclosed the working fluid is being heated by the heating fluid 153 through heat exchanger 152 (not shown).

Figure 8:
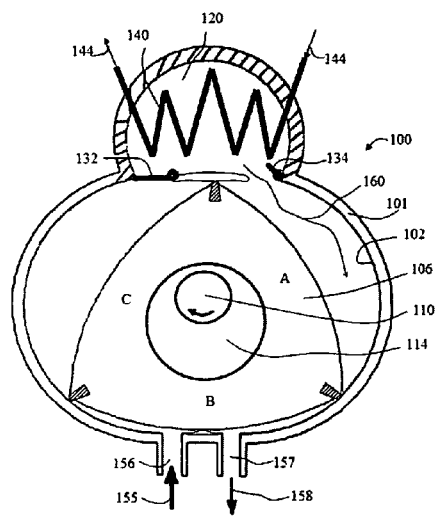
FIG. 8 is a schematic, transverse sectional view of a rotary heat engine showing the first heating chamber and rotor position, wherein the working fluid from the first heating chamber continues to expand against rotor face A.

Turning now to FIG. 8, there are shown rotor positions and the first heating chamber 120, wherein the working fluid from the first heating chamber 120 continues to expand against rotor face A, the compression stroke associated with working chamber C has begun and the left-hand side chamber valve 132 is about to open for admitting working fluid into the first heating chamber 120, and the working chamber B has nearly finished the discharge stroke and is about to start a new intake stroke. At the same time, the second heating chamber 124 remains closed and the working fluid enclosed continues to be heated (not shown).

Figure 9:
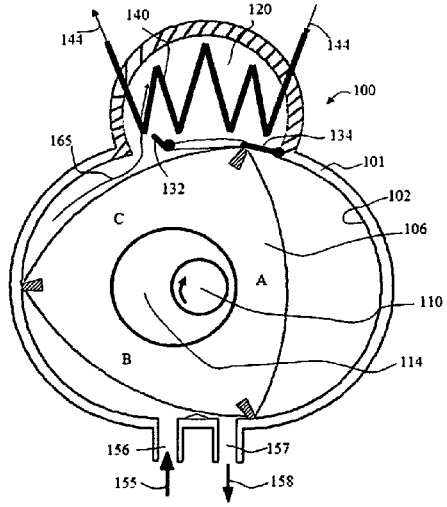
FIG. 9 is a schematic, transverse sectional view of a rotary heat engine showing the first heating chamber and rotor position, wherein the expansion in working chamber A is close to the end, and the working fluid is being compressed from the working chamber C into the first heating chamber.

Turning now to FIG. 9, there are shown rotor positions and the first heating chamber 120, wherein the expansion in working chamber A is close to an end, the working chamber A is about to be opened to the discharge port, the working fluid is being compressed from the working chamber C into the first heating chamber 120, and the working chamber B is continuing its intake stroke. At the same time, the second heating chamber 124 remains closed and the working fluid enclosed continues to be heated (not shown). As the operation is continuing, the two heating chambers would return to the operating conditions represented by FIG. 1 and FIG. 2 and a cycle associated with the operation of the two heating chambers is completed. It should be emphasized that the cycle as described herein is in terms of the operating conditions of the heating chambers, not in terms of the operating conditions of the working chambers related to individual rotor faces.

In this cycle, the eccentric shaft has moved through 2×360 degrees of rotation and the rotor has moved 240 degrees of rotation. As shown in the above figures, there are two power strokes over the cycle, which indicates that each shaft revolution would generate one power stroke. While early opening or closing and late opening or closing of a heating chamber may be a common practice, the shaft rotating angle available for the working fluid being heated while being enclosed in a heating chamber is nominally 360 degrees of the shaft rotation for this two heating chamber per rotor configuration. However, if this heating period is not sufficient, more than two heating chambers per rotor may be employed. In this case and according to the engine structure associated with a Wankel rotary combustion engine, the working principle is similar to the case with two heating chambers per rotor and the shaft rotating angle available for the working fluid being heated while being enclosed in a heating chamber is 360(n−1) degrees, wherein n is the number of heating chambers per rotor. Additionally, a rotary heat engine as described herein may be equipped with multiple rotors and each rotor may be equipped with multiple heating chambers.

Figure 10:
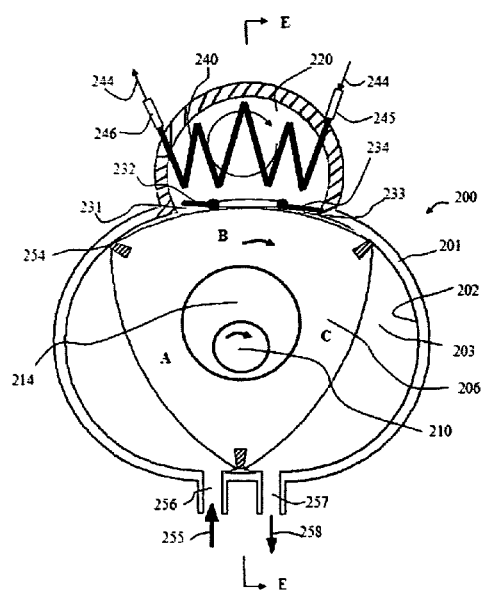
FIG. 10 is a schematic, transverse sectional view of a rotary refrigerator in accordance with the present invention showing the first cooling chamber and rotor position, wherein rotor face B has nearly completed the compression stroke for the first cooling chamber.
Figure 11:
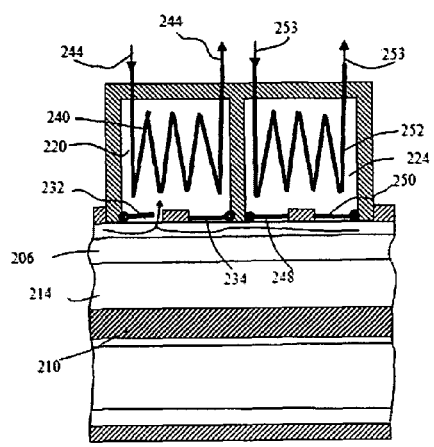
FIG. 11 is a schematic, axial sectional view of a rotary refrigerator with two cooling chambers per rotor, showing the two cooling chambers as well as the positions of the cooling chamber valves associated with the two cooling chambers.

The performance of the heat engine may be reversed to form a refrigerator unit. In this case, the heating chamber in the heat engine is replaced by a cooling chamber in the refrigerator and the heating fluid in the heat engine is replaced by a cooling fluid. Referring now to FIG. 10, there is shown a sectioned view of a rotary refrigerator 200 having a configuration of two cooling-chambers per rotor according to an exemplary embodiment of the invention, and FIG. 11 is an axial sectional view in the direction E-E of FIG. 10. The refrigeration unit 200 comprises an outer body 201 with an inner surface 202 defining a refrigerator cavity or working chamber and surrounding a rotor 206. The inner surface 202 may be a two lobed epitrochoidal surface commonly used in rotary combustion engines, and the rotor 206 is mounted on an eccentric drive shaft 210 having an offset lobe 214 passing through the rotor 206. The rotor 206 is defined by a plurality of rotor faces converging to a plurality of angularly spaced rotor tips 254, each may be provided with a seal slidably engaging the inner surface 202 during the operation of the refrigerator unit.

A first cooling chamber 220 and a second cooling chamber 224 (FIG. 11) are disposed at the outer body 201 illustratively in a position generally corresponding to a spark plug (or plugs) or a fuel injector (or injectors) of a conventional rotary combustion engine, and may be arranged in an axial direction of the outer body 201, as seen in FIGS. 10 and 11. The cooling chamber 220 is provided with two opening ports 231 and 233 in communication with the working chamber space such as 203 formed between the inner surface 202 and the outer surfaces of the rotor 206, and two cooling chamber valves 232 and 234, respectively, associated with the two opening ports, which may block or establish the fluid communication between the cooling chamber 220 and the working chamber space (alternatively, each port may be an opening in a valve member or the two ports may be two openings in a single valve member, not shown). The cooling chamber 220 is also provided with a heat exchanger unit 240, wherein a cooling fluid 244 flows into the heat exchanger unit through an inlet conduit 245 and flows out of the heat exchanger unit through an outlet conduit 246. Similarly, the second cooling chamber 224 (FIG. 11) is provided with two cooling chamber valves, 248 and 250, and a heat exchanger unit 252 with a cooling fluid 253 flowing through the heat exchanger unit 252, as shown in FIG. 11, which is a schematic sectioned view in the direction E-E of FIG. 10 with a purpose of illustrating the positions of chamber valves. As will be discussed later, the number of the cooling chambers may be reduced to one, or the number of the cooling chamber valves may be reduced to one or zero, depending on specific applications.

The three rotor tip seals 254 as shown in FIG. 10 divide the refrigerator working chamber into three sub-working chambers. Each is formed between a respective rotor face, such as A, B, or C, and the inner surface 202 (For brevity, a sub-working chamber associated with a rotor face is referred to as the working chamber of that face), and undergoes a different phase of a four-stroke cycle. In FIG. 10, the working chamber associated with rotor face A is open to an intake port 256 and a gaseous or a two-phase charge 255, such as, but not limited to, air, nitrogen, carbon dioxide, helium, hydrocarbons, water, ammonia, a vapor or a vapor-liquid two-phase mixture, or a refrigerant commonly used in a vapor compression refrigerator, is being drawn into the working chamber. The working chamber associated with face C has just opened a discharge port 257 and expanded working fluid 258 is being discharged out of the refrigerator unit as the cooled fluid. The working chamber associated with face B has nearly finished the compression stroke and most of the working fluid in the camber has been compressed into the first cooling chamber 220, while chamber valve 232 is in a process of being closed. Before the chamber valve 232 is closed, the second cooling chamber 224 is largely closed, enclosing an amount of working fluid entering the second cooling chamber during the last cycle, and the enclosed working fluid is cooled by the cooling fluid 253 through the heat exchanger unit 252 (FIG. 11). Because the compression stroke associated with the first cooling chamber 220 is nearly completed, the chamber valve 250 associated with the second cooling chamber (FIG. 11) is in a process of being opened.

Figure 12:
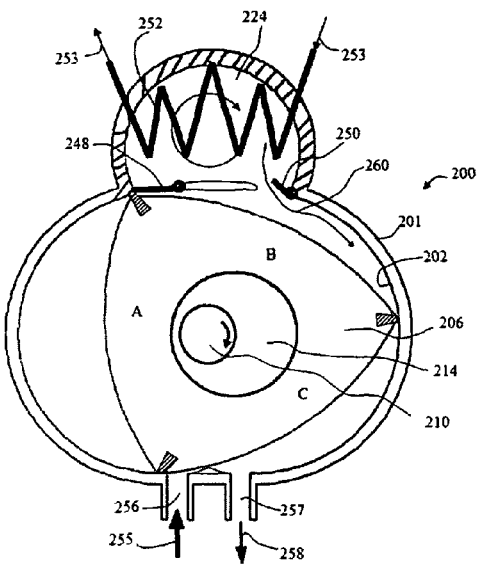
FIG. 12 is a schematic, transverse sectional view of a rotary refrigerator showing the second cooling chamber and rotor position, wherein working fluid expands from the second cooling chamber into the working chamber B, returning an amount of work to the rotor.

Turning now to FIG. 12, there are shown rotor positions and the second cooling chamber 224, wherein the working chamber A is nearly at its peak volume, the intake port 256 has been closed, and through the discharge port 257 the expanded working fluid is being forced out of the working chamber C as the cooled fluid delivery. The chamber valve 250 associated with the right-hand side opening of the second cooling chamber 224 has been opened, and after an amount of heat is being removed from and its temperature is lowered, the working fluid 260 expands from the second cooling chamber into the working chamber B, returning an amount of work to the rotor and further lowering its temperature. At the same time, both the chamber valves 232 and 234 associated with the first cooling chamber 220 are closed, enclosing the working fluid entering the first cooling chamber earlier, and the enclosed the working fluid is being cooled by the cooling fluid 244 through the heat exchanger 240 (not shown).

Figure 13:
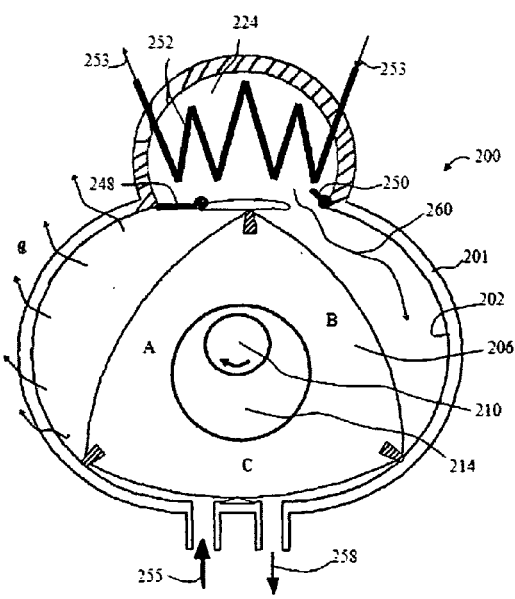
FIG. 13 is a schematic, transverse sectional view of a rotary refrigerator showing the second cooling chamber and rotor position, wherein the working fluid from the second cooling chamber continues to expand against rotor face B.

Turning now to FIG. 13, there are shown rotor positions and the second cooling chamber 224, wherein the working fluid from the second cooling chamber 224 continues to expand against rotor face B, the compression stroke for the working chamber A has begun and the left-hand side chamber valve 248 is about to open to admit the working fluid into the second cooling chamber 224, and the working chamber C has nearly finished the discharge stroke and is about to start a new intake stroke. At the same time, the first cooling chamber 220 remains closed and the working fluid enclosed continues to be cooled (not shown). To reduce the work consumption during the compression, the portion of the outer body 201 between the intake port and the cooling chamber may be cooled through a cooling means, so that heat may be transferred out of the working fluid being compressed through the corresponding portion of the inner surface 202, as schematically represented by the heat transfer rate q in FIG. 13. On the other hand, during the expansion, the temperature of the working fluid may be reduced to that below the ambient temperature. Therefore, the portion of the outer body 201 between the discharge port and the cooling chamber may be insulated (not shown). One skilled in the art may recognize that when the working fluid temperature is below the temperature of the cooling fluid in the expansion stroke, the heat transfer in the cooling chamber may reverse the direction and the heat may be added from the cooling fluid to the working fluid in the cooling chamber. To minimize this effect on the fluid in the working chamber, the port leading to the working chamber may be closed earlier, or the chamber valve such as 250 in FIG. 13 may be closed earlier, to isolate the working fluid in the cooling chamber from that in the working chamber.

Figure 14:
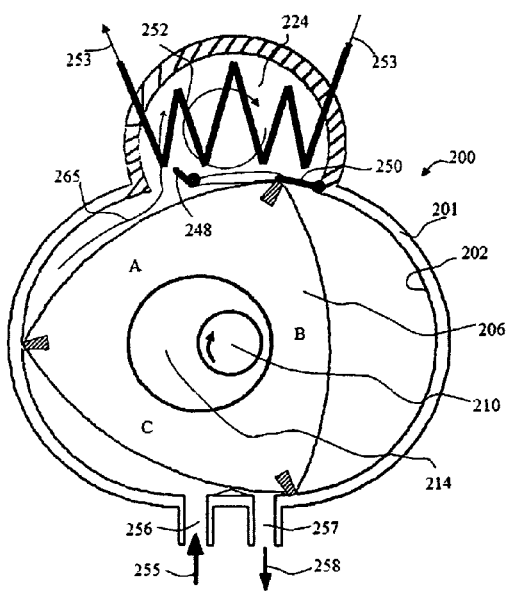
FIG. 14 is a schematic, transverse sectional view of a rotary refrigerator showing the second cooling chamber and rotor position, wherein the expansion stroke associated with the working chamber B has nearly completed, and working fluid is being compressed into the second cooling chamber from the working chamber A.

Turning now to FIG. 14, there are shown rotor positions and the second cooling chamber 224, wherein the expansion stroke associated with working chamber B has nearly completed while the chamber valve 250 has closed the right-hand side port, the second cooling chamber 224 has already been opened to working chamber A, admitting compressed working fluid 265 from the working chamber A, and the working chamber C is continuing its intake stroke. At the same time, the first cooling chamber 220 remains closed and the working fluid enclosed continues to be cooled (not shown).

Figure 15:
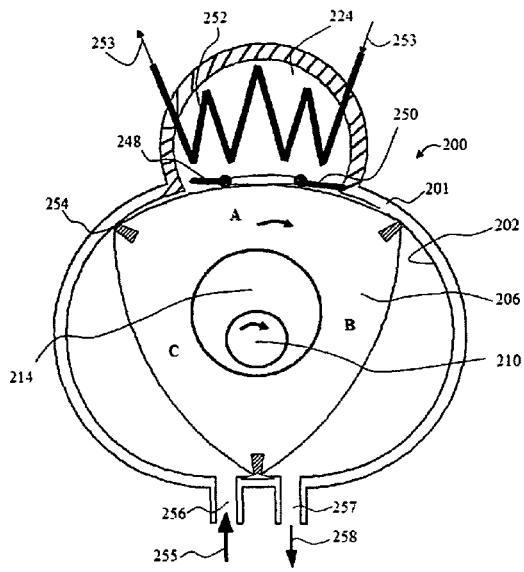
FIG. 15 is a schematic, transverse sectional view of a rotary refrigerator showing the second cooling chamber and rotor position, wherein the working chamber A has nearly reached its maximum compression into the second cooling chamber and the second cooling chamber is about to be closed.

Turning now to FIG. 15, there are shown rotor positions and the second cooling chamber 224, wherein the working chamber A has nearly reached its minimum volume while the second cooling chamber is about to be closed through the closing of the chamber valve 248, the working chamber C has nearly finished its intake process, and the face B has just opened the discharge port. At the same time, the first cooling chamber 220 is about to open for an expansion stroke (not shown).

Figure 16:
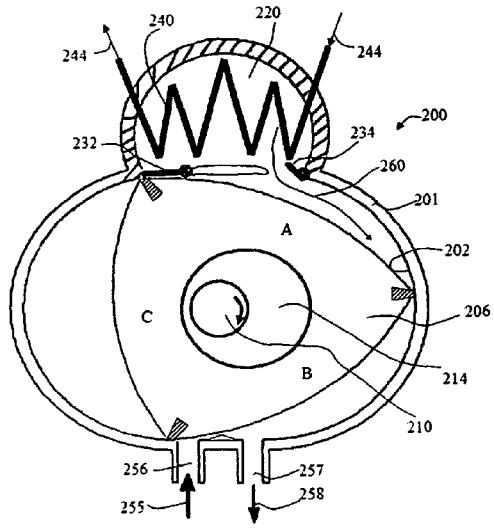
FIG. 16 is a schematic, transverse sectional view of a rotary refrigerator showing the first cooling chamber and rotor position, wherein the working fluid expands from the first cooling chamber into the working chamber A, returning an amount of work to the rotor.

Turning now to FIG. 16, there are shown rotor positions and the first cooling chamber 220, wherein the chamber valve 234 has opened, and after an amount heat has been removed and its temperature is reduced, the working fluid 260 expands from the first cooling chamber into the chamber A, returning an amount of work to the rotor face A and further lowering its temperature, the working chamber B is discharging its expanded working fluid out of the working chamber, and the working chamber C is near its peak volume and the intake to the chamber C is blocked. At the same time, both the chamber valves 248 and 250 associated with the second cooling chamber 224 are closed, enclosing the working fluid entering the second cooling chamber earlier, and the enclosed the working fluid is being cooled by the cooling fluid 253 through heat exchanger 252 (not shown).

Figure 17:
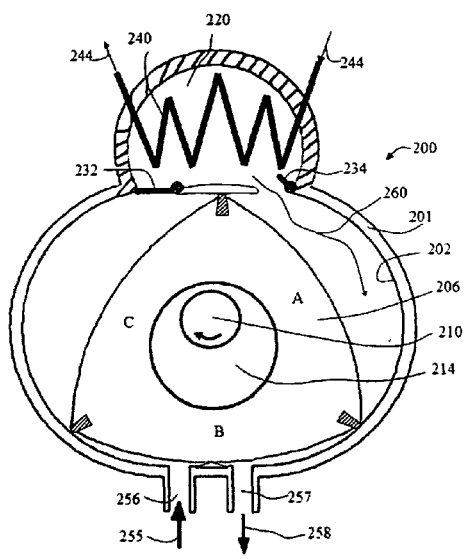
FIG. 17 is a schematic, transverse sectional view of a rotary refrigerator showing the first cooling chamber and rotor position, wherein the working fluid from the first cooling chamber continues to expand against the rotor face A.

Turning now to FIG. 17, there are shown rotor positions and the first cooling chamber 220, wherein the working fluid from the first cooling chamber 220 continues to expand against rotor face A, the compression stroke associated with the working chamber C has begun and the left-hand side chamber valve 232 is about to open for admitting the working fluid into the first cooling chamber 220, and the working chamber B has nearly finished the discharge stroke and is about to start a new intake stroke. At the same time, the second cooling chamber 224 remains closed and the working fluid enclosed continues to be cooled (not shown).

Figure 18:
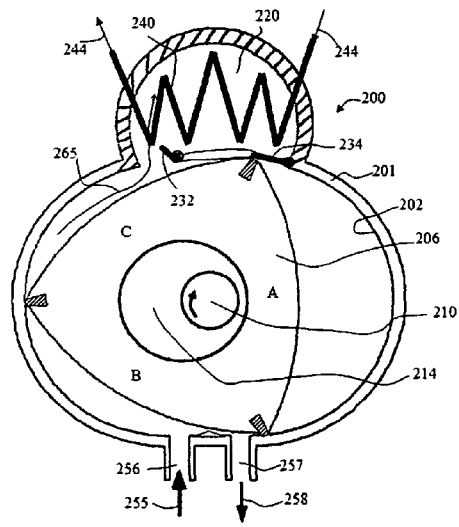
FIG. 18 is a schematic, transverse sectional view of a rotary refrigerator showing the first cooling chamber and rotor position, wherein the expansion in the working chamber A is close to the end, and the working fluid is being compressed from the working chamber C into the first cooling chamber.

Turning now to FIG. 18, there are shown rotor positions and the first cooling chamber 220, wherein the expansion in working chamber A is close to the end and the chamber A is about to be opened to the discharge port, the working fluid is being compressed from the working chamber C into the first cooling chamber 220, and the working chamber B is continuing its intake stroke. At the same time, the second cooling chamber 224 remains closed and the working fluid enclosed continues to be cooled (not shown). As the operation is continuing, the cooling chambers of the refrigerator unit would return to the operating conditions represented by FIG. 10 and FIG. 11 and a cycle associated with the operation of the two cooling chambers is completed. It should be emphasized that the cycle as described herein is in terms of the operating conditions of the cooling chambers, not in terms of the operating conditions of the working chambers related to individual rotor faces.

In this cycle, the eccentric shaft has moved through 2×360 degrees of rotation and the rotor has rotated 240 degrees. As shown in FIGS. 10-18, there are two discharge strokes over the cycle, which indicates that each shaft revolution would generate one discharge stroke. While early opening or closing and late opening or closing of a cooling chamber may be a common practice, the shaft rotating angle available for the working fluid being cooled while being enclosed in a cooling chamber is nominally 360 degrees of the shaft rotation for this configuration of two cooling chambers per rotor. However, if this cooling period is not sufficient, more than two cooling chambers per rotor may be employed. In this case, the working principle is similar to the case with two cooling chambers per rotor, and the shaft rotating angle available for the working fluid being cooled while being enclosed in a cooling chamber is 360(n−1) degrees, wherein n is the number of cooling chambers per rotor. Additionally, a rotary refrigerator unit as described herein may be equipped with multiple rotors and each rotor may be equipped with multiple cooling chambers.

One skilled in the art may recognize that the refrigerator unit disclosed herein may be one of the stages in a cascade-cycle refrigeration system, in which the cooling fluid in the present stage may be the discharged cooled working fluid from a higher-temperature stage, or the discharged working fluid of the present stage may be the cooling fluid of a lower temperature stage.

The chamber valve, as described above related to the rotary heat engine and refrigerator as well as the piston-type heat engine and refrigerator as will be disclosed later, may be a commonly used valve, such as a puppet valve, slide valve, rotary valve, butterfly valve, switch valve, gate valve, sleeve valves or ball valve, or another less commonly known valve, depending on specific design requirements. Additionally, the use of a valve member having more than one opening ports may be used, and the ports associated with one or more chambers may be the opening ports in a single valve member.

One skilled in the art may also readily recognize that the common practices of variable valve timing and lift as well as valve overlap periods will be still applicable to the operation of the valves in the present invention. In the context of heating-chamber valves or cooling chamber valves, early/late opening or early/late closing as well as valve overlap periods may be common practices for the heat engine and refrigerator in accordance with the present invention.

In contrast to the disclosures illustrated in FIG. 1 through FIG. 18, wherein each heating or cooling chamber is equipped with at least two opening ports, a single opening port per chamber in conjunction with a opening/closing mechanism for the port may be employed (not shown). The reduction of the opening ports may have some benefits such as structural simplification, however certain fluid short-circuiting among the compression working chamber, heating or cooling chamber, and expansion chamber may occur.

One skilled in the art may recognize that when the average heat transfer rate over the heat transfer duration, $\bar{Q}_{HT}$, in Eq. (3) is becoming increasingly larger, the requirement for a longer heat transfer duration, $\Delta\theta_{HT}$, may become less stringent in the cycle of a heat engine. Similarly, when the average heat removal rate over the heat transfer duration is becoming increasingly larger, the requirement for a longer heat removal duration, $\Delta\theta_{HT}$, may become less stringent in the cycle of a refrigeration unit. In these cases, a heat engine or refrigerator may be equipped with a single heating chamber or cooling chamber per rotor, and thus the structure of the heat engine or refrigerator may be simplified. In some applications, the benefits of a simplified structure may outweigh the benefits of longer heat transfer duration. Therefore, a single heating or cooling chamber per rotor or piston may be still employed even if the heat transfer rate is moderate. However, the configuration of two chamber valves associated with the two opening ports per heating or cooling chamber may be retained to avoid the fluid short circuiting between the two adjacent working chambers or to create stronger convection inside the heating or cooling chamber.

Figure 19:
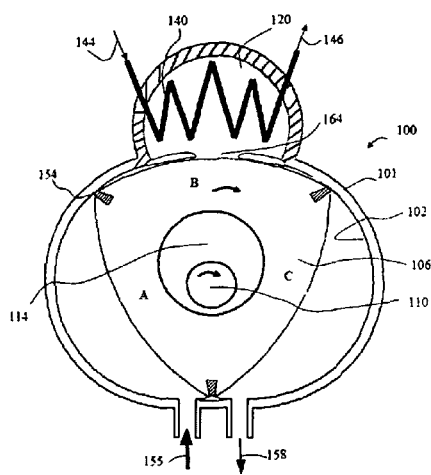
FIG. 19 is a schematic, transverse sectional view of a rotary heat engine with one heating chamber per rotor, wherein the heating chamber has only one opening port to the working chamber space without a chamber valve.

It is well known that the installation of a valve at an opening port may increase the structure complexity or cause throttling effect, which could reduce the efficiency of the heat engine or refrigerator. In some cases, the heating chamber valves or cooling chamber valves related to the two opening ports per heating or cooling chamber may be removed under the condition of a single heating or cooling chamber per rotor (not shown). Additionally, the two ports without an opening or closing mechanism may be reduced to the situation of one port 164 without an opening or closing mechanism, as shown in FIG. 19, which is an illustration based on a heat engine with one heating chamber per rotor. Similarly, the two ports without an opening or closing mechanism may be reduced to the situation of one port without an opening or closing mechanism for the refrigerator of this invention (not shown).

The heat exchanger units as illustrated in FIGS. 1-19 are schematic in nature, wherein the heat transfer from a heat source to the working fluid is realized through a heating fluid and the heat removal from the working fluid to heat sink is realized through a cooling fluid. Said heat exchanger may be any type of heat exchanger suitable for a specific application. When the working fluid is a gas or vapor, the heat exchanger may be a gas-to-liquid, gas-to-two-phase, or gas-to-gas heat exchanger. On the side of the heat exchanger in contact with the working fluid, fins may be employed to enhance the heat transfer rate of the heat exchanger similar to the common practice in a conventional heat exchanger (not shown). A specific selection of the heat exchanger however, may be largely determined by the condition of the heating fluid in a heat engine or the condition of the cooling fluid in a refrigeration unit.

Figure 20:
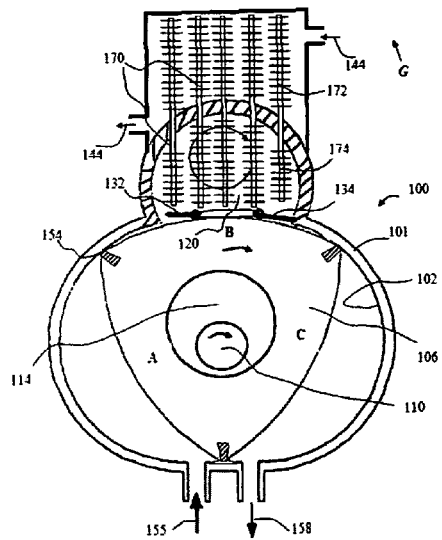
FIG. 20 is a schematic, transverse sectional view of a rotary heat engine employing a heat-pipe type heat exchanger.

It is well known in the art that it is more difficult to attain a high heat transfer rate in a gas-to-gas heat exchanger. Two types of heat exchangers, the heat pipe heat exchanger and the rotary regenerator may be employed to attain a higher heat transfer rate within a given volume. FIG. 20 illustrates schematically a specific version of the rotary heat engine with a heat pipe heat exchanger 170. The heat exchanger 170 is divided, through the wall of the heating chamber 120, into an evaporator section 172 and a condenser section 174. A heating fluid 144 flows into the evaporator section from the right and exits the evaporator section to the left, transferring heat to the heat pipe though the finned evaporator section (if the heating fluid is a liquid or a two-phase mixture, the fins may not be necessary). The heat received in the evaporator section is transferred to the finned condenser section 174 through the heat pipes, which in turn transfers the heat to the working fluid of the heat engine inside the heating chamber. To enhance the heat transfer and reduce the reliance on the wick structure of the heat pipes, the heat-pipe heat exchanger is preferably oriented in a favorable gravitation field G as indicated, which would assist the return of the condensate from the condenser section back to the evaporator section. Alternatively other types of heat pipe systems including the separate-type heat pipe system or the capillary pumped loop system may be employed.

For the refrigerator in accordance with the present invention, the heating fluid 144 in FIG. 20 may be replaced by a cooling fluid, the evaporator section 172 would become a condenser section and the condenser section 174 would become an evaporator section, and the preferred direction of the gravitational field as indicated in FIG. 20 may be reversed.

Figure 21:
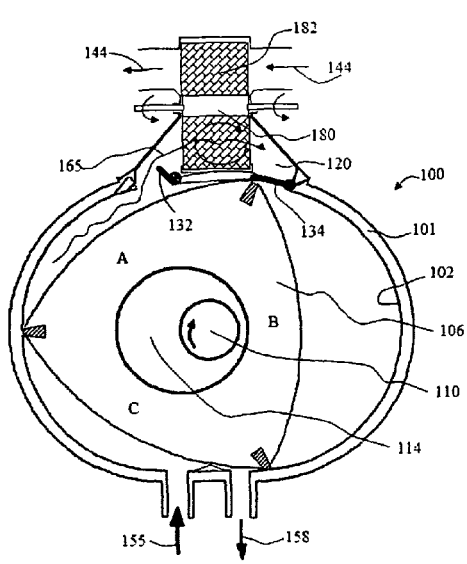
FIG. 21 is a schematic, transverse sectional view of a rotary heat engine employing a rotary regenerator-type heat exchanger.

FIG. 21 illustrates schematically another specific version of the rotary heat engine with a rotary regenerator 180, which facilitates the heat transfer from the heating fluid 144 to the working fluid 165 of the heat engine within the heating chamber 120 through the rotating disk 182 of permeable matrix. Seal mechanisms must be provided for the separation of the heating fluid 144 from the working fluid 165 in the heating chamber. Alternatively, a rotary regenerator with rotating drum configuration may be employed (not shown). One skilled in the art may recognize that the above disclosed rotary regenerator may also be employed as a heat exchanger in a refrigerator of the present invention.

For a heat engine wherein energy is extracted from a heating fluid through a heat exchanger unit, the heat transfer from the heating fluid to the working fluid of the heat engine may be significantly affected by the effective temperature difference between the heating fluid and the working fluid in the heating chamber. A lower compression ratio will produce a lower temperature of the compressed working fluid at the end of the compression stroke, thus providing a larger temperature difference and a higher heat transfer rate for a given temperature level of the heat source. However, a lower compression ratio may generally result in a lower thermal efficiency of the engine. An optimum engine construction would match the temperature level of the heating fluid with an appropriate compression ratio associated with a heating chamber to extract a larger amount of heat from the heating fluid and at the same time maintain a certain level of overall engine thermal efficiency, wherein a higher local heating fluid temperature would match a higher compression ratio and a lower local heating fluid temperature would match a lower compression ratio. This may be accomplished through the flow arrangement of the heating fluid and a sequential variation in the compression ratio for the heating chambers associated with a rotor, wherein the heating chambers may have sequentially increased working fluid volumes in the flow direction of the heating fluid for sequentially decreased compression ratios associated with the heating chambers. It should be emphasized that the working fluid volume associate with a heating chamber is different from the volume of the heating chamber, as the working fluid volume in a heating chamber excludes the volume occupied by the heat exchanger wall and heating fluid as well as the volume of other hardware that may be disposed in a heating chamber.

Alternatively, the heating-fluid flow stream arrangement mentioned above may be applied at a rotor level for a heat engine having more than one rotor, wherein the rotors in a heat engine may have sequentially decreased effective rotor compression ratios in the flow direction of the heating fluid. This decreased compression ratio may be realized through the increase of overall working fluid volume in the heating chamber or chambers associated with a rotor or through the change in the configurations of other engine components such as piston, connecting rod, or crankshaft.

Figure 22:
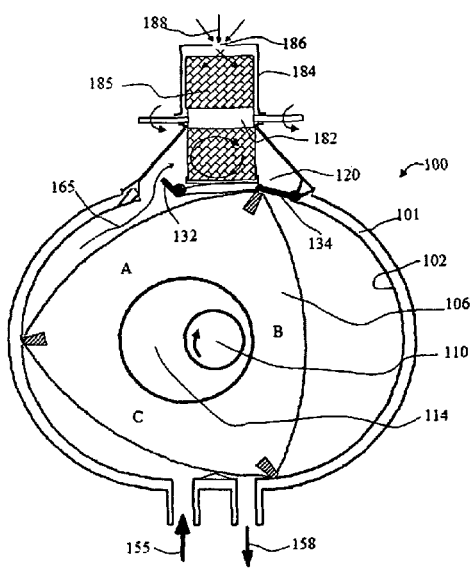
FIG. 22 is a schematic, transverse sectional view of a rotary heat engine employing a rotary regenerator-type heat exchanger, wherein solar energy is directly transferred to the heat exchanger.

In the foregoing disclosures, the heat transfer from a heat source to the working fluid is realized through a heating fluid. On the other hand, the thermal energy may be directly transferred from a heat source to the working fluid of the heat engine without an intermediate heating fluid. One exemplary application is a solar thermal energy power plant, wherein one side of the heat exchange unit may directly receive energy from a solar beam and the heat is then transferred to the working fluid of the engine. FIG. 22 illustrates schematically another specific version of the heat engine with a rotary-regenerator heat exchanger 182, which facilitates the direct energy transfer from solar beam 188 to the working fluid 165 of the heat engine within the heating chamber 120, through a rotating disk 185 of permeable matrix without an intermediate heating fluid. Said heat exchanger has a containment shell 184 including an aperture 186 for admitting concentrated sunlight from a solar receiver or a plurality of solar receivers, such as mirrors or lens. As the disk rotates, the heat received from the solar energy source is being transferred to the working fluid 165 of the heat engine in the heating chamber 120. Alternatively, a rotary regenerator with rotating drum configuration may be employed (not shown).

The above disclosures for the heat engine and refrigerator are based on the structure of the Wankel rotary engine. However, the spirit of the present invention is also applicable to rotary heat engines and refrigerators based on other types of lobed rotary engine structures.

It should be noted that although the embodiments of the heat engine or refrigeration unit so far are based largely on the structure of a rotary-type engine, the embodiments of the present invention are naturally applicable and equally important to a heat engine or refrigeration based on the structures of other types of engines, such as an Otto-type engine, a diesel-type engine, a two-stroke scavenging type engine, a paired piston engine, or a reciprocating free piston engine without a crankshaft.

Figure 23:
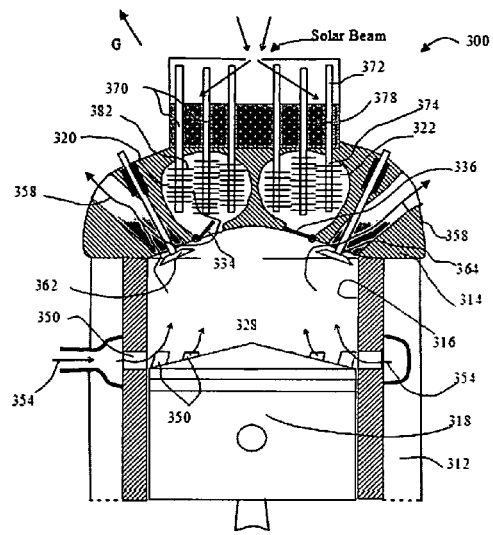
FIG. 23 is a schematic sectional illustration of a heat engine based on the structure of a conventional two-stroke piston-type combustion engine and utilizing a scavenging method in accordance with the present invention.

Turning now to FIG. 23, there is shown an exemplary illustration of a heat engine 300 having two-heating chambers, being based on the structure of a conventional two-stroke internal combustion engine and utilizing a scavenging method in accordance with the present invention, and operating exemplarily on a solar energy source in conjunction with heat-pipe heat exchanger units 370 and phase-change energy storage material 378. Said engine 300 includes a cylinder block 312 and a cylinder head 314. The cylinder block 312 contains at least a cylinder 316 and a piston 318 that is slidably disposed within the cylinder 316. Associated with each engine cylinder 316, the cylinder head 314 defines a first heating chamber 320 and a second heating chamber 322. The first heating chamber 320 is provided with an opening port to the cylinder space. The opening port may be opened or closed by a heating-chamber valve 334 that may establish or block communication between the first heating chamber and the cylinder space. Similarly, the second heating chamber 322 is provided with a heating-chamber valve 336 that may establish or block communication between the second heating chamber and the cylinder space. The scavenging method as shown in FIG. 23 may be a through scavenge or uniform scavenge, which uses inlet ports in the cylinder wall, uncovered by the piston 318 as it approaches the bottom dead center. Charge 354 flows into the cylinder space and pushes out the expanded working fluid in the cylinder through discharge ports opened by discharge valves 362 and 364. The heat engine according to the present embodiment as shown in FIG. 23 may be adapted to work on a four stroke cycle. In general, for a cylinder equipped with n heating chambers, wherein n is an integer, the nominal crank angle that is available for a compressed working fluid being enclosed in a heating chamber to receive heat from the heating fluid is:

$$360(n-1)(CA)$$

and the engine may operate on a 2n stroke cycle, wherein n is an integer greater than or equal to 2.

The heat-pipe heat exchanger in the heat engine based on a two-stroke piston engine, as shown in FIG. 23, may be replaced by a rotary regenerator. Although in general a heat engine configuration with more than one heating chamber per cylinder may be employed, a special configuration having only one heating chamber per cylinder and employing a rotary regenerator is exemplarily illustrated in FIG. 24. Said heating chamber may also have two opening ports 386 and 388 to the cylinder space without a valve. Said rotary-regenerator heat exchanger 390 facilitates the direct heat transfer from solar beam 398 to the working fluid of the heat engine within the heating chamber 384, through two rotating disk 392 and 394 of permeable matrix without an intermediate fluid, and has a containment shell including an aperture 396 for admitting concentrated sunlight from a solar receiver or a plurality of solar receivers, such as mirrors or lens. As the disk rotates, the heat received from the solar energy source is being transferred to the working fluid of the heat engine in the heating chamber 384. The purpose of utilizing more than one disk is to create rotation of the working fluid inside the chamber in connection with each opening port of the heating chamber, which will be elaborated later. Alternatively, a rotary regenerator with rotating drum configuration may be employed (not shown).

Figure 25:
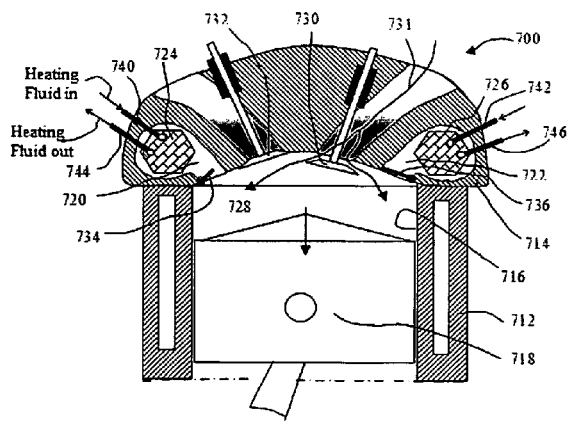
FIG. 25 is a schematic sectional illustration of a heat engine based on the structure of a conventional four-stroke piston-type combustion engine in accordance with the present invention.

Having disclosed the embodiments of the present invention in terms of rotary engines or two-stroke piston engines, the embodiment of the present invention based on the structure of conventional four-stroke piston engines is disclosed. FIG. 25 illustrates a heat engine 700 in accordance with the present invention, which includes a cylinder block 712 and a cylinder head 714. The cylinder block 712 contains at least a cylinder 716 and a piston 718 that is slidably disposed within the cylinder 716. Associated with each engine cylinder 716, the cylinder head 714 defines a first heating chamber 720 and a second heating chamber 722. Furthermore, associated with the heating chambers, a first heat exchanger unit 724 and a second heat exchanger unit 726 are disposed, respectively, within the heating chambers 720 and 722. When the piston 718 reaches the top dead center, cylinder space 728, as defined by the bottom face of the cylinder head 714, the top face of the piston 718, and the sidewall of the cylinder 716, may be minimized. The cylinder head is provided with an intake port and a discharge port, and the intake port has an intake valve 730, and the discharge port has a discharge valve 732. Additionally, the first heating chamber 720 is provided with an opening port to the cylinder space. The opening port may be opened or closed by a heating-chamber valve 734 that may establish or block fluid communication between the first heating chamber and the cylinder space. Similarly, the second heating chamber 722 is provided with a heating-chamber valve 736 that may establish or block fluid communication between the second heating chamber and the cylinder space. It should be emphasized that the arrangement as shown in FIG. 25 is just one of many possible options; other arrangements such as those maximizing intake and discharge areas by employing multiple intake valves and multiple discharge valves are possible. Also the configuration having more than one chamber valve per heating chamber is also a possibility.

Like the embodiments of other types of engines, the energy transfer from a heat source to the working fluid of the engine may be facilitated through the heat exchanger unit such as 724 or 726 disposed primarily within the heating chamber. The term of a heat exchanger in this invention refers to a system that facilitates heat exchange between two fluids separated by a wall or between a fluid and a surface receiving heat from a heat source, due to a temperature difference between the two fluids or between the fluid and the surface. In the case as shown in FIG. 25, the heating fluid is separated from the working fluid, and preferably has a sufficiently higher temperature than that of the working fluid. The heating fluid flows into the heat exchanger unit through an inlet conduit such as 740 or 742, and flows out of the heat exchanger unit through an outlet conduit such as 744 or 746. It should be pointed out the heat exchanger as shown in FIG. 25 is generic for the purpose of demonstration, which does not exclude the use of the various types of heat exchangers disclosed in connection with the rotary and two-stroke type piston heat engines including the case of direct energy transfer from a heat source without the use of a heating fluid. Thus, the heating fluid as well as the types of heat exchangers that have been described earlier in conjunction with other types of heat engines will be applicable to the present case, and will not be repeated herein. For the configuration of two heating chambers per cylinder as shown in FIG. 25, the heat engine may be adapted to work on an eight essential stroke cycle. These eight strokes may include:

1. An intake stroke associated with the first heating chamber 720, while the second heating chamber 722 has been closed since the completion of the compression stroke in the last cycle, enclosing an amount of compressed working fluid in the second heating chamber, and the enclosed working fluid is being heated up by the heating-fluid stream. The intake valve 730 is open while discharge valve 732 is closed. Piston 718 moves downwardly, admitting an amount of working fluid 731 into the cylinder 716.

2. A compression stroke associated with the first heating chamber 720. In this case, intake valve 730 and discharge valve 732 are both closed, while the second heating chamber is still in a closed position. Piston 718 moves upwardly, compressing an amount of intake working fluid into the first heating chamber 720 to a higher pressure.

3. A power stroke associated with the second heating chamber 722. In this case, both the intake valve 730 and discharge valve 732 remain closed, while the first heating-chamber valve 734 is closed, enclosing an amount of compressed working fluid in the first heating chamber, and the enclosed working fluid is being heated up by the heating-fluid stream. After an amount of heat is added and its temperature and pressure are raised, the working fluid with a higher pressure and a higher temperature expands from the second heating chamber 722 into the cylinder space, delivering work to the piston 718.

4. A discharge stroke associated with the second heating chamber 722. In this case, intake valves 730 and the first heating chamber remain closed. The discharge valve 732 is opened, discharging expanded working fluid out of the cylinder.

5. An intake stroke associated with the second heating chamber 722. In this case, the discharge valve 732 is closed and the intake valve 730 is opened, while the first heating chamber remains closed. Piston 718 moves downwardly, admitting an amount of working fluid into the cylinder.

6. A compression stroke associated with the second heating chamber 722. In this case, the intake valve 730 is closed while the discharge valve 732 and the first heating chamber remain closed. Piston 718 moves upwardly, compressing an amount of intake working fluid into the second heating chamber 722 to a higher pressure.

7. A power stroke associated with the first heating chamber 720. In this case, intake valve 730 and discharge valve 732 are both closed, while the second heating-chamber valve 722 is also closed, enclosing an amount of compressed working fluid in the second heating chamber, and the enclosed working fluid is being heated up by the heating fluid stream. After being enclosed within the first heating chamber and being heated up by the heating fluid through the heat exchanger unit 724 for an extended duration, the higher pressure and higher temperature working fluid expands from the first heating chamber 720 into the cylinder space, delivering work to the piston 718, and 8. A discharge stroke associated with the first heating chamber 720. In this case, the intake valve 730 remains closed and the discharge valve 732 is opened, while the second heating chamber remains closed. After delivering work to the piston in the preceding power stroke, expanded working fluid is discharged out of the cylinder to complete the cycle, and the engine would return to the intake stroke associated with the first heating chamber to complete the cycle.

In the above cycle, the number of power strokes is two and the number of strokes per power stroke in the cycle is four, which is the same as the case of an Otto cycle. As a result, an increase in the heat transfer duration has not resulted in an increase in the number of strokes per power stroke in the cycle.

Additionally, the cycle described above may be just one of the many feasible cycles based on the heat engine platform in accordance with the present invention. For example, in the above cycle, the fifth and sixth strokes associated with the second heating chamber may be replaced by the power stroke and discharge stroke associated with the first heating chamber, and the seventh and eighth strokes associated with the first heat chamber may then be replaced by the intake and compression strokes associated with the second heating chamber. However, with these alternations, the time period for a working fluid to receive heat from a heat source under a constant volume may be cut in half.

One skilled in the art may readily recognize that the eight strokes described above are essential strokes in a cycle according to the present invention. In fact, a heat engine may be adapted to operate on a cycle having any number of strokes. Non-essential strokes to this invention may be added before the first stroke and after the last stroke, or be inserted among the strokes of the cycle mentioned above.

For the two-heating-chamber configuration as shown in FIG. 25, nominally each heating chamber is given 720 degrees of crank angle available for the working fluid being enclosed within the chamber to receive heat from the heat source. If this amount of time period (crank angle) is not sufficient, each cylinder may be equipped with more than two heating chambers, and the crank angle available for heating up the working fluid enclosed within a heating chamber will thus be increased accordingly. For example, for a cylinder equipped with three heating chambers, the working fluid entering the first heating chamber during the compression stroke may remain to be enclosed and continue to receive heat from the heat source over the next eight strokes serving other heating chambers before the heated working fluid is released from the first heating chamber into the cylinder space to deliver work to the piston. These eight strokes serving other heating chambers may be the power, discharge, intake and compression strokes for a second heating chamber and the power, discharge, intake and compression strokes for a third heating chamber. As a result, the nominal crank angle (CA) available for the compressed working fluid in a heating chamber to receive heat from the heating fluid is $$2 \times 720 = 1440 (CA)$$

and the engine may operate on a twelve-stroke cycle. In general, for a cylinder equipped with n heating chambers, wherein n is an integer, the normal crank angle that is available for the working fluid enclosed in a heating chamber to receive heat from the heat source is:

$$720(n-1)(CA)$$

and the engine may operate on a 4n stroke cycle, wherein n is an integer greater than or equal to 2. It should be emphasized that the above evaluation is based on the assumption that the operating conditions for all heating chambers in a cyclic are similar, and ideally, the curve of temperature versus time or the curve of pressure versus time associated with a heating chamber may be obtained through shifting in phase the corresponding curve associated with another heating chamber. The above description excludes the existence of non-essential strokes. With the inclusion of non-essential strokes, both the crank angle and the number of strokes in a cycle may be increased. Also for the working fluid remaining within a heating chamber after the completion of a discharge stroke (residual working fluid), the heating time would be even longer. It should be pointed out that although theoretically an engine may be equipped with any number of heating chambers per cylinder, in practice the number of heating chambers per cylinder may be limited due to the space and various operational constraints.

As mentioned earlier, a lower working fluid temperature at the end of the compression stroke would have the benefit of absorbing more heat from a heat source. This is particularly important for applications involving a relatively low heat source temperature. Also mentioned in the earlier disclosures is that although a lower compression ratio would reduce the working fluid temperature but at the same time it would reduce the thermal efficiency of the engine. One approach to overcome this dilemma is to pre-cool the intake working fluid before it is directed into the engine working chamber for compression. This pre-cooling of the working fluid may be undertaken through a refrigeration system. Said refrigeration system may include, but not limited to, a vapor-compression system, an absorption refrigeration system, and an ejector refrigeration system. A preferred type of refrigeration system herein may be a heat driven refrigeration system, such as an absorption refrigeration system or an ejector refrigeration system, wherein the heating fluid discharged out of the heat engine or the working fluid discharged out of the engine may be a heat source for the heat driven refrigeration system. Alternatively, the heat to the refrigeration system may be provided by a heating fluid without flowing through the heat engine.

One skilled in the art should recognize that the operation of the disclosed heat engines based on either the structure of a two-stroke type piston engine or a four-stroke type piston engine may be reversed to become a refrigerator based on the structure of the two-stroke type piston heat engine or four-stroke type piston heat engine, and a detailed description on the performance principle of the refrigerator may not be necessary. Additionally, many foregoing disclosures related to the heat exchanger in a heating chamber may be applicable to a refrigerator with reversed operation. In particular for a refrigerator, the cooling fluid may be a liquid coolant that removes the heat from the working fluid and dissipate the removed heat into the ambient through a separate liquid-air heat exchanger or radiator. The cooling fluid may also be a gas such as air from the ambient. Thus, the heat exchanger in a cooling chamber may be a gas-gas heat exchanger as disclosed in connection with a heat engine, or an air cooled heat exchanger. However, in most situations, extended surfaces such as fins may be employed on the working fluid side of the heat exchanger (not shown in the figures related to a refrigerator).

One skilled in the art may also recognize that the heat transfer in a heating chamber of an heat engine or in a cooling chamber of a refrigeration may be significantly affected by the motion of the working fluid relative to heat exchanger surfaces such solid walls and fins. The motion of the working fluid in a heating or cooling chamber may be generated during the compression process when the intake working fluid is compressed into the heating or cooling chamber. Similar to the concept of an auxiliary chamber or pre-chamber in an internal combustion engine, the motion of the working fluid in a heating or cooling chamber may be enhanced through shaping the heating or cooling chamber as well as the opening port associated with the chamber, so that near the end of the compression stroke, a vigorous working fluid flow is set up in the chamber or the working fluid would rotate rapidly within the chamber. This vigorous flow or rotation would provide a foundation for a high heat transfer rate between the working fluid and the heat exchanger surface. With reference to FIG. 5 for a heat engine and FIG. 14 for a refrigerator unit, when the working fluid is being compressed into the chamber, a clockwise circulation of the working fluid in the chamber may be generated due to the interior circular shape of the chamber and the direction in which the working fluid enters the chamber. Additionally, with reference to FIG. 3 for the heat engine and FIG. 12 for the refrigerator when the working fluid is being released into the working chamber in an expansion stroke, the clockwise rotating of the working fluid in the chamber may be maintained. Therefore, a vigorous clockwise rotation of the working fluid, as shown in FIG. 1 for a heat engine and FIG. 10 for a refrigeration unit, may be sustained over the entire cycle. Additionally with a configuration of two opening ports for a heating or cooling chamber, as shown in FIGS. 1-18, and FIGS. 20-21, a net amount of working fluid would flow into the chamber from the opening on the left and flow out of the chamber from the opening on the right in a cycle. Thus, a countercurrent flow arrangement of the working fluid relative to the flow direction of the heating or cooling fluid is created, which may be superposed with the working-fluid circulation indicated earlier if desired. It should be pointed out that a heating chamber or a cooling chamber in a piston-type heat engine or refrigerator may be equipped with two opening ports to create the counter-flow arrangement or sustained rotation similar to the case of a rotary heat engine or refrigerator.

In some situations however, if vigorous flow or rotation in a heating chamber or cooling chamber is not sustainable after the completion of the compression stroke, or the strength of the flow or rotation is not sufficiently strong, an agitation means may be provided. Said agitation means may include, but not limited to, an impeller, a turbine, a propeller, or a stirrer which is suitable for enhancing the motion of the working fluid relative to the heat exchanger surface, or a blower to direct the flow to the heat exchanger surface. The agitation means may be driven by a mechanism or motor external or internal of the chamber. Alternatively the agitation means may be driven by the incoming working fluid to the heating or cooling chamber during the compression stroke with the option of attaching a flywheel to the drive shaft of the agitation means external or internal of the heating or cooling chamber.

The above disclosed heat engine or refrigerator may have either an open-cycle configuration or a closed-cycle configuration. For a heat engine having an open-cycle configuration, said heat engine may use air as the working fluid, wherein the expanded working fluid may be directly discharged from a discharge port into a space or the surroundings having a relatively constant temperature or pressure, and the intake working fluid into the intake port may be from the same space or surroundings having substantially the same temperature or pressure. Since the power density of a heat engine may be generally lower as compared to that of a combustion engine, a compression mean such as a supercharger or turbocharger with or without an after cooler may be commonly employed to increase the density of the intake fluid. To reduce the lubricating oil consumption of the engine, an air-oil separator may be disposed at the discharge port to substantially remove the oil mist from the air before the air is being discharged into the ambient. Said air-oil separator may be a type similar to that conventionally used for compressed air, natural gas, refrigerant, compressed natural gas/natural gas vehicle, or other air/oil filter applications.

Figure 26:
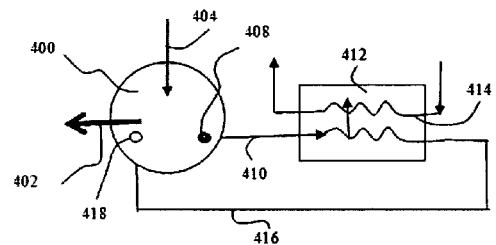
FIG. 26 illustrates schematically a heat engine according to the present invention having a closed-cycle configuration and with or without an over expansion mechanism.
Figure 27:
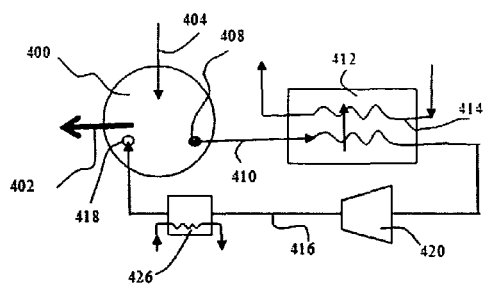
FIG. 27 illustrates schematically a heat engine having a closed-cycle configuration and with or without an over expansion mechanism, wherein a compression means for the working fluid intake is employed with or without an after-cooler or intercooler.

The open-cycle configuration of a heat engine may have the benefit of being compact and structural simplification. On the other hand, a heat engine having a closed-cycle may have the benefits of a higher power output through the pressurization of the gaseous working fluid enclosed in the engine system and power and heat dual-output applications. FIG. 26 illustrates schematically a heat engine 400 according to the present invention having a closed-cycle configuration, wherein said engine 400 receives thermal energy 404 from a heat source and delivers a net amount of power 402 to a power utilization system. Through a discharge passageway 410, discharged working fluid out of the engine 400 is led from a discharge port 408 to a heat exchanger 412 or a radiator, wherein an amount of heat is being removed from the discharged working fluid to a coolant 414 and the removed heat may be used for other purposes, or being directly dissipated into the ambient. The working fluid with a lower temperature exits the heat exchanger or radiator, and is directed by an intake passageway 416 into the engine 400 through an intake port 418. In some situations, particularly for a heat engine based on a two-stroke piston engine, a compressor or blower 420 may be disposed between the heat exchanger 412 and intake port 418, as shown in FIG. 27. An after-cooler 426 may also be employed to reduce the temperature of the intake fluid before entering the engine. The after-cooler or inter-cooler described herein or in other cases throughout this invention may also involve the cooling through a refrigeration system. As mentioned earlier, a compressor or blower with or without an after cooler may also be disposed before the intake port for a heat engine having an open-cycle configuration (not shown).

The working fluid of the heat engine may be a suitable gas, such as, but not limited to, air, nitrogen, hydrogen, carbon dioxide, helium, or a vapor. For a closed-cycle configuration, the heat engine may be pressurized, wherein the average pressure of the working fluid enclosed within the engine system when the engine is not in operation may be higher than the ambient pressure. The pressurized heat engine may have the advantage of having an increased power density due to an increased working fluid density enclosed within the heat engine.

Figure 28:
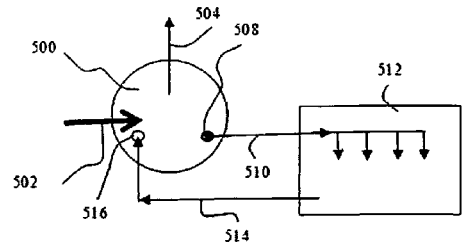
FIG. 28 illustrates schematically a refrigerator with or without an over expansion mechanism, wherein the cooled working fluid is directly discharged into a space or onto an object being cooled.

For a refrigerator according to the present invention and having an open-cycle configuration, the cooled working fluid flowing out of the discharge port may be directly into a space or onto an object being cooled, and the intake working fluid into the intake port may be from the same space being cooled or directly from the surroundings. FIG. 28 illustrates schematically a refrigerator 500 according to the present invention, wherein said refrigerator unit 500 receives an amount of work 502 from a power source and removes an amount of heat 504 to a heat sink (not shown). Through a discharge passageway 510, discharged working fluid out of the refrigerator, such as air with a lower temperature, is led from a discharge port 508 to a space 512, such as a house, and is being distributed to the desired locations for cooling purpose. An amount of fluid, such as air, having a higher temperature than that of the discharged fluid, would return to the refrigerator 500 through a passageway 514 and intake port 516. To reduce the lubricating oil consumption of the refrigerator and avoid oil related pollution, an air-oil separator may be disposed at the discharge port to substantially remove the oil mist from the air before the air is being discharged into the space 512. Said air-oil separator may be a type similar to that conventionally used for compressed air, natural gas, refrigerant, compressed natural gas/natural gas vehicle, or other air/oil filter applications.

Figure 29:
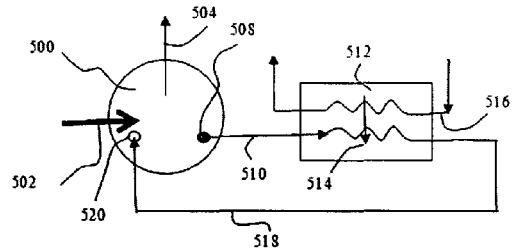
FIG. 29 illustrates schematically a refrigerator with or without an over expansion mechanism according to the present invention, having a closed-cycle configuration.
Figure 30:
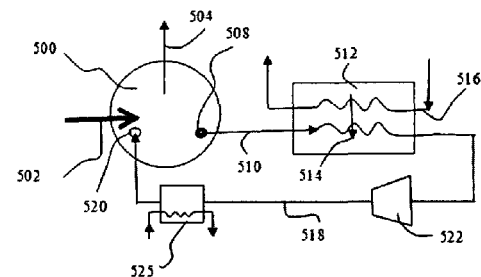
FIG. 30 illustrates schematically a refrigerator with or without an over expansion mechanism having a closed-cycle the configuration, wherein a compression means is employed with or without an after cooler.

On the other hand, a refrigerator having a closed-cycle may have the benefit of a higher cooling load through the pressurization of the gaseous working fluid enclosed in the refrigeration system and the permission of using a different gas other than air. Exemplarily, FIG. 29 illustrates schematically a refrigerator unit 500 according to the present invention having a closed-cycle configuration, wherein said refrigerator 500 receives an amount of work 502 from a power source and removes an amount of heat 504 to a heat sink. Through a discharge passageway 510, discharged working fluid out of the refrigerator 500 is led from a discharge port 508 to a heat exchanger 512, wherein an amount of heat 514 is being transferred from a second fluid 516 to the discharged working fluid, effectively lowering the temperature of the second fluid for a cooling purpose. The working fluid with a higher temperature exits the heat exchanger, and is directed by an intake passageway 518 into the refrigerator 500 through an intake port 520. In some situations, a compression means 522, such as a compressor, may be disposed between the heat exchanger 512 and intake port 520, as shown in FIG. 30. An after-cooler 525 may also be employed to cool down the intake fluid before entering the refrigerator. One skilled in the art may also recognize that a compression means (not shown), with or without an after cooler, may also be disposed before the intake port of a refrigerator having an open-cycle configuration as shown in FIG. 28 to increase the amount of intake charge or the intake pressure of the refrigerator.

The working fluid of the refrigerator may be a suitable gas or a two-phase mixture, such as, but not limited to, air, nitrogen, carbon dioxide, helium, hydrocarbons, ammonia, hydrogen or water. For a closed-cycle configuration, the refrigerator may be pressurized, wherein the average pressure of the working fluid enclosed within the refrigerator system when the refrigerator is not in operation may be higher than the ambient pressure. The pressurized refrigerator system may have the advantage of having an increased cooling capacity due to an increased working fluid density enclosed within the refrigerator system.

Figure 31:
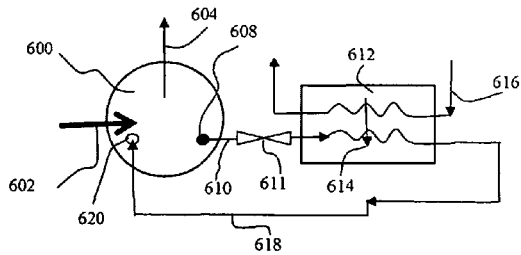
FIG. 31 illustrates schematically a refrigeration system, wherein the refrigerator unit according to the present invention has the functionalities of the compressor, heat removal, and expander in a vapor-compression refrigeration system.

The refrigerator unit in accordance with the present invention may be employed in a vapor-compression refrigeration system. An exemplary application is related to a trans-critical cycle using carbon dioxide as the working fluid. During the operation of the refrigerator according to the present invention, the working fluid substantially in a vapor phase is compressed into a cooling chamber at a pressure above the critical pressure during a compression stroke. Heat is removed from the compressed vapor in the cooling chamber, lowering its temperature as well as the pressure. After the heat removal, the working fluid expands in the following expansion stroke, returning an amount of work to the rotor or piston. At the discharge port, the working fluid may be in a vapor-liquid two phase state or still a vapor state with reduced pressure and temperature. A further expansion through an expansion device, such as an expansion valve, may be or may not be needed depending on specific working conditions. The working fluid is then led to an evaporator where the working fluid is being substantially vaporized into a vapor, absorbing heat from a fluid, a material or a space being cooled. The low-pressure vapor exits the evaporator and returns to the refrigeration unit to complete the cycle. FIG. 31 illustrates schematically such a refrigerator unit 600 according to the present invention having a closed-cycle configuration, wherein said refrigerator 600 receives an amount of work 602 from a power source and removes an amount of heat 604 to a heat sink (not shown). Through a discharge passageway 610, discharged working fluid flowing out of the refrigerator unit 600 is led from a discharge port 608 to an evaporator 612, wherein an amount of heat 614 is being transferred from a second fluid 616 to the discharged working fluid, effectively lowering the temperature of the second fluid for the cooling purpose. The working fluid primarily in a vapor phase exits the evaporator, and is directed by an intake passageway 618 into the refrigerator 600 through an intake port 620. An expansion device 611 may be disposed before the evaporator to further lower the pressure of the working fluid if needed. In the present application, the refrigerator unit may have the functionalities of the compressor, heat removal, and expander in the vapor-compression refrigeration system. It should be pointed that a working fluid other than carbon dioxide may be employed in the above trans-critical cycle or the refrigerator unit may be employed in a subcritical cycle of a vapor-compression refrigeration system using many aforementioned working fluids or commonly used chemicals in commercial vapor-compression refrigeration systems.

As discussed earlier in this disclosure, a heat engine may face a serous dilemma because of the nature of heat acquisition by the working fluid through a heat exchanger. To receive a larger amount of heat from a heat source for an increased power output of the heat engine, a lower working fluid temperature at the end of compression is preferred, which may demand a lower compression ratio. However, this lower compression ratio may result in a lower thermal efficiency of the heat engine, which may reduce the energy utilization rate from the heat source and at the same time also may have a negative effect on the power output of the engine. One solution to this dilemma is to employ a cycle which has a relatively high thermal efficiency but requiring a relatively low compression ratio. It is well known that an engine having a greater expansion ratio than the compression ratio may have an increased thermal efficiency compared to that of equal compression and expansion ratios, which may be employed to resolve the dilemma mentioned above.

Figure 32:
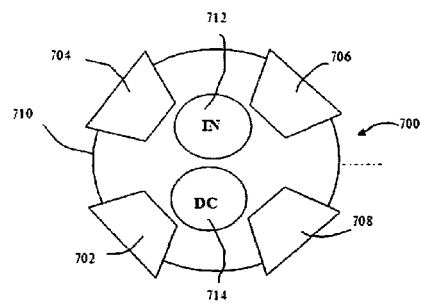
FIG. 32 is a schematic top view of a heat engine based on the structure of a conventional four-stroke piston-type combustion engine in accordance with the present invention with four heating chambers associated with a cylinder.

Based on the configuration of at least two combustion chambers per cylinder, U.S. patent application Ser. No. 11/716,844 to Cao disclosed a thermodynamic cycle which enables a greater expansion ratio than the compression ratio for an internal combustion engine. A similar cycle may be employed herein for a heat engine configuration having two or more heating chambers per cylinder. Exemplarily, the cycle with such a feature is disclosed in terms of the configuration of four heating chambers per cylinder as shown in FIG. 32 related to the heat engine shown in FIG. 25 based on the structure of a four-stroke combustion engine. In this case, the first heating chamber 702 and the second heating chamber 704 may share an intake stroke and a compression stroke while the third heating chamber 706 and the fourth heating chamber 708 may share an intake stroke and a compression stroke, and the heat engine may operate on a twelve essential stroke cycle. These twelve strokes in the cycle may include: (1) an intake stroke for the first and second heating chambers, in which an amount of working fluid is admitted into the cylinder space while the third and fourth heating chambers are closed and the working fluid entering the third and fourth heating chambers in the last cycle is being heated by a heat source; (2) a compression stroke associated with the first and second heating chambers, in which an amount of intake working fluid is compressed into both the first and second heating chambers, while the third and fourth heating chambers remain closed; (3) a power stroke for the third heating chamber, in which working fluid with a higher pressure and temperature from the third heating chamber expands into cylinder space, delivering work to the piston, while the fourth heating chamber as well as the first and second chambers remain closed. The working fluid entering the first and second heating chambers in the preceding compression stroke is being heated by a heat source; (4) a discharge stroke associated with the third heating chamber in which expanded working fluid after delivering work is discharged out of the cylinder space while all other heating chambers remain closed; (5) a power stroke for the fourth heating chamber in which higher pressure and higher temperature working fluid from the fourth heating chamber expands into cylinder space, delivering work to the piston, while the third chamber is closed and the first and second chambers remain closed; (6) a discharge stroke associated with the fourth heating chamber in which expanded working fluid after delivering work is discharged out of the cylinder space while the first and second heating chambers remain closed; (7) an intake stroke for the third and fourth heating chambers, in which an amount of working fluid is admitted into the cylinder space while the first and second heating chambers remain closed; (8) a compression stroke associated with the third and fourth heating chambers, in which an amount intake working fluid is compressed into both the third and fourth heating chambers while the first and second heating chambers remain closed; (9) a power stroke for the first heating chamber in which higher pressure and higher temperature working fluid from the first heating chamber expands into cylinder space, delivering work to the piston, while all other heating chambers are closed, and the working fluid entering the third and fourth heating chambers in the preceding compression stroke is heated by a heat source; (10) a discharge stroke associated with the first heating chamber in which expanded working fluid after delivering work is discharged out of the cylinder space while the other heating chambers remain closed; (11) a power stroke for the second heating chamber in which higher pressure and higher temperature working fluid from the second heating chamber expands into cylinder space, delivering work to the piston, while the first heating chamber is closed and the third and fourth heating chambers remain closed; and (12) a discharge stroke associated with the second heating chamber in which expanded working fluid after delivering work is discharged out of the cylinder space while the third and fourth chambers remain closed. The operation of the heat engine would then return to the intake stroke for both the first and second heating chambers to complete the cycle.

In the above cycle, the number of intake strokes in the cycle is two, resulting in a total of six strokes per intake stroke, which may lower the power output of the engine as compared to the base cycle with the same compression and expansion ratio and may represent a penalty for an increased thermal efficiency.

One skilled in the art may recognize that the duration of the working fluid being heated in the second heating chamber under a constant volume (nominally 1440 CA) may be greater than that in the first heating chamber (nominally 1080 CA), and the duration of the working fluid being heated under a constant volume in the fourth heating chamber (nominally 1440 CA) may be greater than that in the third heating chamber (nominally 1080 CA). However, this asymmetric condition may be eliminated by exchanging the roles of the first and second chambers and the roles of the third and fourth chambers in a next cycle. Additionally, the above four-chamber configuration may be increased to 6 and the engine may operate on an eighteen-stroke cycle. In general, with n chambers per cylinder and each two chambers share an intake stroke and a compression stroke, wherein n is an integer, the engine may operate on a 3n stroke cycle. In a particular situation with n=2, both chambers share an intake stroke and a compression stroke, and the engine may operate on a six-stroke cycle. With this configuration, however, one of the chambers may lose the benefit of having an extended heating period under a constant volume before the expansion stroke. Furthermore for this two-chamber, six-stroke cycle situation, if the chamber valve is removed from one of the chambers, the benefit of a greater expansion ratio than the compression ratio may also be reduced. The above disclosures are related to the cases in which n is an even number. The same principle may be readily applied to the cases when n is an odd number.

It should also be noted that the spirit of the present invention to increase the expansion ratio is not limited to the situation of two chambers sharing an intake stroke and a compression stroke. The same principle may be applicable to three or more heating chambers sharing an intake stroke and a compression stroke. If the number of heating chambers sharing an intake stroke and a compression stroke is m, wherein m is an integer, the relation between the expansion ratio and the compression ratio would be $$r_e = m(r_c - 1) + 1$$

and the ratio of the expansion ratio to the compression ratio is therefore $$r_e/r_c = m(1 - 1/r_c) + 1/r_c$$

wherein $r_e$ and $r_c$ are respectively the expansion and compression ratios. When m=2 and $r_c$=6, $r_e/r_c$=1.83, which indicates that the increase in the expansion ratio is about 83%. With this amount of increase, the thermal efficiency improvement may be in the range of 10-20%. It may also be shown that with a lower compression ratio, $r_c$, the increase in thermal efficiency is greater. Exemplarily, under ideal operational conditions, it may be demonstrated that when m=2 and $r_c$=10, the increase of thermal efficiency over the base cycle having the same compression and expansion ratio may be amounted to 10-20 percent. When $r_c$=4, however, the increase in thermal efficiency may be amounted to 30 percent. As such, the above disclosed cycle may be particularly beneficial to a heat engine extracting energy from a heat source of a relatively low temperature, which requires a lower compression ratio.

Figure 33:
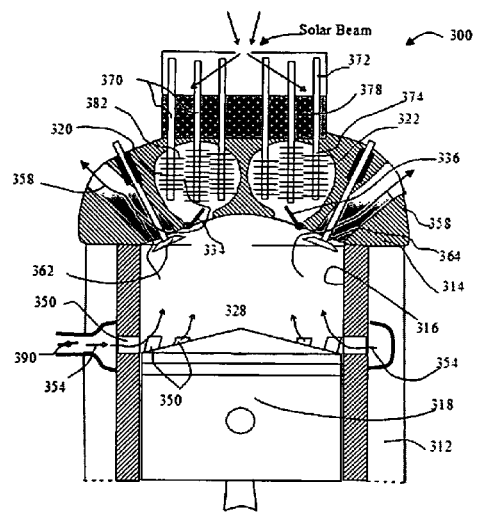
FIG. 33 is a schematic sectional illustration of a heat engine based on the structure of a conventional two-stroke piston-type combustion engine and utilizing a scavenging method, wherein a valve is added at an intake port.

The over expansion cycle of Cao may also be applied to a rotary engine or two-stroke piston engine. Although there may be many variations particularly related to different heat sources, an over expansion cycle for a heat engine, as shown in FIG. 23, having two heating chambers per cylinder and built upon the structure of a two-stroke piston combustion engine is disclosed. In this case, the engine may operate on a four-stroke cycle with an added intake valve 390 as shown in FIG. 33. Said cycle may include: (1) a compression stroke for both heating chambers 320 and 322, wherein working fluid is compressed into both heating chamber; (2) a power stroke for the first heating chamber, wherein working fluid from the first heating chamber flows into the cylinder space and delivers work to the piston, while the second heating chamber is closed and enclosed working fluid is being heated. Additionally, the intake valve 390 is closed; (3) a discharge stroke in connection with the first heating chamber, wherein the piston move upwardly, discharging the expanded working fluid while the intake valve 390 and the second heating chamber remain closed; (4) a power stroke related to the second heating chamber, wherein working fluid from the second heating chamber flows into the cylinder space, delivering work to the piston while the first heating chamber is closed; and (5) a scavenge process when the piston is near the bottom dead center, wherein the intake valve 390 is open and the intake fluid flows into the cylinder space 328 from the intake ports, expelling the expanded working fluid out of the cylinder space 328, as schematically shown in FIG. 33.

In this cycle, the number of strokes per intake charge is four. Additionally in the present case of two heating chambers per cylinder, the time period for the working fluid being heated within the first heating chamber is shorter unless two non-essential strokes are inserted before the power stroke for the first heating chamber. However, with an increased number of heating chambers per cylinder, the heating period may be increased. Exemplarily, considering the case having three heating chambers per cylinder with the structure similar to that shown in FIG. 33, the heat engine may exemplarily operate on an eight stroke cycle. Said cycle may include: (1) a compression stroke for both the first and second heating chambers, wherein intake charge is compressed into both chambers, while the third heating chamber is closed, enclosing the working fluid entering the third heating chamber in the last cycle and the enclosed working fluid is being heated up by a heat source; (2) a power stroke for the third heating chamber, wherein the piston moves downwardly, while the first and second heating chambers are closed and the enclosed working fluid is being heated up by the heat source; (3) a discharge stroke for the third heating chamber by the piston, wherein the piston moves upwardly while the intake valve 390 may be closed and the first and second heating chambers remain closed; (4) a power stroke for the first heating chamber, wherein the piston moves downwardly, while the second and third heating chambers are closed; (5) a scavenge process for the first and third heating chambers, wherein the intake valve 390 is open and the intake fluid flows into the cylinder space from the intake ports, expelling the expanded working fluid out of the cylinder space, while the second heating chamber remains closed; (6) a compression stroke for the first and third heating chambers, wherein the intake charge is compressed into the both chambers, while the second heating chamber remains closed; (7) a power stroke for the second heating chamber, wherein the piston moves downwardly, while the first and third heating chambers are closed and the enclosed working fluid is being heated up by the heat source; (8) a discharge stroke for the second heating chamber, wherein the piston moves upwardly while the intake valve 390 may be closed and the first and third heating chambers remain closed; (9) a power stroke for the first heating chamber, wherein the piston moves downwardly, while the second and third heating chambers are closed; and (10) a scavenge process for the first and second heating chambers, wherein the intake valve 390 is open and the intake fluid flows into the cylinder space 328 from the intake ports, expelling the expanded working fluid out of the cylinder space 328, while the third heating chamber remains closed. The operation of the heat engine would then return to the compression strokes for both the first and second heating chambers to complete the cycle.

In the above eight-stroke cycle, there are two scavenge processes, and therefore, the number of strokes per intake charge is still four. However, because of the increase in the number of heating chambers per cylinder, the time period for the working fluid to receive heat from the heat source while being enclosed within a heating chamber may be increased. Notice also that this time period may not be the same for all three chambers, thus different chamber designs or heat exchanger surface areas may be applied to different heating chambers to accommodate the different heating time periods.

Still with the similar configuration as shown in FIG. 33 but having four heating chambers per cylinder, the engine may operate on an eight-stroke cycle, which may include: (1) a compression stroke for both the first and second heating chambers; (2) a power stroke for the third heating chamber; (3) a discharge stroke for the third heating chamber; (4) a power stroke for the fourth heating chamber; (5) a scavenging process for the third and fourth chambers; (6) a compression stroke for the third and fourth chambers; (7) a power stroke for the first heating chamber; (8) a discharge stroke for the first heating chamber; (9) a power stroke for the second heating chamber; and (10) a scavenging process for the first and second chambers.

In the above case of four heating chambers per cylinder, the number of strokes per intake charge is still four. Thus, it may be concluded from the three exemplary cases related to the engine structure as shown in FIG. 33 that the number of strokes per intake charge may remain the same as the number of the heating chambers per cylinder is increased. However, as the number of the heating chambers per cylinder is increased, the time period for working fluid to receive heat from a heat source in the heating chambers is generally increased.

Figure 34:
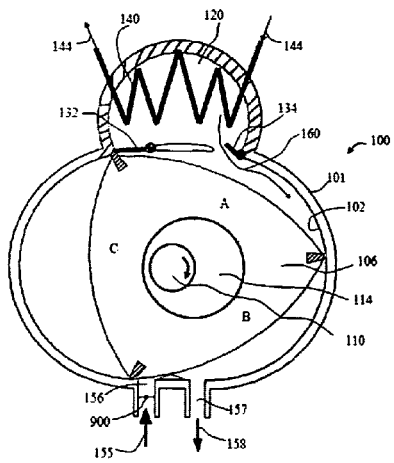
FIG. 34 is a schematic, transverse sectional view of a rotary heat engine in accordance with the present invention, wherein an intake valve is added at an intake port.

The over expansion cycle of Cao as applied to a rotary heat engine disclosed earlier is now considered with the addition of an intake valve 900 as shown in FIG. 34. The exemplary disclosure in the following is based on the rotary heat engine having two heating chambers per rotor. In this case, the rotary engine may operate on five stages, which may include:
1. A power stage for the working fluid from the first heating chamber, wherein the working fluid flows from the first heating chamber 120 into working chamber A, delivering work to the rotor 106, as shown in FIG. 34, while the second heating chamber 124 is closed and enclosed working fluid is being heated by a heating fluid. Additionally, the intake to working chamber C was preferably blocked through the closing of valve 900 in the last cycle and thus the pressure inside the working chamber C is lower compared to the pressure at the intake port. Said power stage may last about 270 degrees of drive shaft rotating angle. However, toward the late part of this stage, the intake valve 900 as shown in FIG. 34 has opened for admitting intake charge into working chamber B.
2. A middle intake stage into the working chamber B for both the first and second heating chamber, wherein the volume of the working chamber C would approach a minimum and the second chamber remains closed. Said middle intake stage may last about 90 degrees of drive shaft rotating angle.
3. A power stage for the working fluid from the second heating chamber, wherein the working fluid flows from the second heating chamber into the working chamber C, delivering work to the rotor, while the first heating chamber is closed. Additionally, the intake to the sub-working chamber of face A was preferably blocked through the closing of valve 900. Said power stage may last about 270 degrees of drive shaft rotating angle.
4. A late compression stage of the working fluid associate with the working chamber B, wherein the left-side valves for both the first and second heating chambers are opened, and the working fluid from the working chamber B is compressed into both the first and second heating chambers. Said stage would complete when the working fluid volume of the working chamber B (not including the working fluid volume in both heating chambers) reaches a minimum, which also marks the completion of an operational cycle associated with the two heating chambers. Said late compression stage may also last about 90 degrees of drive shaft rotating angle.

In the above cycle, the drive shaft has rotated a total of two revolutions (720 degrees) with one intake charge, which is compared to one revolution (360 degrees) per intake charge for the cycle without the over expansion mechanism of the working fluid. It should be noted that the time period for the working fluid in the first heating chamber to receive heat from the heat source is nominally 360 degrees shorter than that of the working fluid in the second heating chamber, unless one non-essential revolution of the drive shaft is inserted before the power stage for the first heating chamber. This heating period may also be increased without a non-essential revolution, however, if the number of the heating chambers per rotor is increased.

Exemplarily, considering the case having three heating chambers per rotor, the heat engine may exemplarily operate on an eight-stage cycle. Said cycle may includes: (1) a power stage for the first heating chamber (about 270 degrees), wherein the other two chambers are closed, enclosing an amount working fluid entering the two heating chambers in the last cycle, and the enclosed working fluid is being heated up by a heat source; (2) a middle intake stage for both the first and second heating chambers (nearly 90 degrees), while the second and third heating chambers remained closed; (3) a power stage for the second heating chamber (about 270 degrees), while the other two heating chambers are closed; (4) a late compression stage for both the first and second heating chambers (about 90 degrees), wherein working fluid is compressed into both the first and second heating chambers while the third heating chamber remains closed; (5) a power stage for the third heating chamber (about 270 degrees), while the other two heating chambers are closed; (6) a middle intake stage for both the second and third heating chambers (about 90 degrees), while the first and second heating chambers are closed; (7) a power stroke for the second heating chamber, while the other two heating chambers are closed; and (8) a late compression stage for both the second and third heating chambers, wherein the working fluid is compressed into both the second and third heating chambers.

In the above cycle, the number of revolutions of the shaft is four and the number of the intake charges is two. Thus, the number of revolutions per intake charge remains the same. However, the time period for working fluid to receive heat from the heat source while being substantially enclosed within each heating chamber has been increased by one revolution.

It should be pointed out that the arrangement of the stages in the description of the cycle above may be arbitrary and may be devised based on the convenience of description, and the numbering for individual heating chambers may be altered without any material change on the cycle.

The over expansion of a heat engine may also be realized using the concept of Miller cycle patented by Ralph Miller in the 1940s related to a combustion engine through early or late closing of the intake valve to decrease the effective compression ratio. Exemplarily, consider a heat engine based on the structure of a four-stroke piston combustion engine with two heating chambers per cylinder and with early closing of the intake valve, as shown in FIG. 25. In this case, the heat engine may operate on an eight stroke cycle, which may include: (1) an intake stroke for the first heating chamber, in which an amount of working fluid, which is less than the maximum intake charge due to the early closing of the intake valve, is admitted into the cylinder space while the second heating chamber is closed and the working fluid entering the second heating chamber in the last cycle is being heated by a heat source; (2) a compression stroke associated with the first heating chamber, in which an amount of working fluid in the cylinder space is compressed into the first heating chamber, while the second heating chamber remains closed; (3) a power stroke associated with the second heating chamber, in which working fluid from the second heating chamber expands into cylinder space, delivering work to the piston, while the first heating chamber is closed and the intake working fluid entering the first heating chamber in the preceding compression stroke is being heated by a heat source; (4) a discharge stroke associated with the second heating chamber in which expanded working fluid after delivering work is discharged out of the cylinder space while the first heating chamber remains closed; (5) an intake stroke for the second heating chamber, in which an amount of working fluid, which is less than the maximum intake charge due to the early closing of the intake valve, is admitted into the cylinder space while the first heating chamber remains closed; (6) a compression stroke associated with the second heating chamber, in which an amount intake working fluid in the cylinder space is compressed into the second heating chamber while the first heating chamber remains closed; (7) a power stroke for the first heating chamber in which the heating fluid from the first heating chamber expands into cylinder space, delivering work to the piston, while the second heating chamber is closed and the working fluid entering the second heating chamber in the preceding compression stroke is heated by a heat source; and (8) a discharge stroke associated with the first heating chamber in which expanded working fluid after delivering work is discharged out of the cylinder space while the second heating chamber remains closed. The operation of the heat engine would then return to the intake stroke associated with the first heating chamber to complete the cycle.

The performance comparison of a heat engine using the Miller cycle concept with that of a heating engine without using the Miller cycle concept would follow that of an international combustion engine except that in the present case, the heat is transferred to the working fluid through a heat source. Having demonstrated the case of two heating chambers per cycle with early closing of the intake valve, the case of one heating chamber per cylinder or more than two heating chambers per cylinder with either early closing or late closing of the intake valve will be obvious to one skilled in the art, and will not be described herein. The Miller cycle in terms of late closing of the intake valve may be particularly advantageous in conjunction with a compression means for the intake charge before the intake port for the cylinder space of the present heat engine.

The concept of the Miller cycle may also be employed for rotary heat engines in accordance with the present invention, with the addition of an intake valve 900 at the intake port such as that shown in FIG. 34. Exemplarily, considering a rotary heat engine with two heating chambers per rotor and with early closing of the intake valve, the operation of the heat engine may be described in terms of the engine cycle as illustrated by FIGS. 1-9, with the early closing of the intake valve associated with the intake strokes in connection with the working chambers. For instance, in FIG. 1, the intake valve (not shown) at the intake port 156 may be closed earlier before the intake port 156 is blocked by face C of the rotor 106 to reduce the intake amount of the working fluid to the working chamber A. In FIG. 5, the intake valve (not shown) has already been reopened for admitting working fluid into the working chamber C. In FIG. 6, however, the intake valve (not shown) may be closed to reduce the intake amount of the working fluid to the working chamber C. Then in FIG. 9, the intake valve (not shown) has already been reopened for admitting working fluid into the working chamber B.

As disclosed earlier, however, the above disclosed cycles having an expansion ratio greater than the effective compression ratio may have the penalty of a lower power output due to an increased number of strokes per intake stroke in connection with the cycle of Cao, and due to a decreased intake charge in connection with the Miller cycle. Additionally, for a moderate pressure rise of the working fluid during the heating process in the heating chamber of a heat engine or for a decreased pressure during the cooling process in the cooling chamber of a refrigerator unit employing an over expansion cycle, the pressure of the working fluid may reach a level lower than the pressure at the discharge port before the expansion stroke is complete, which may reduce the benefit of the over expansion. These difficulties may be overcome by combing the present heat engine or refrigerator with a compression means such as a supercharger or a turbo-charger, in conjunction with an after cooler, to increase the intake charge density and pressure at the intake port.

Figure 35:
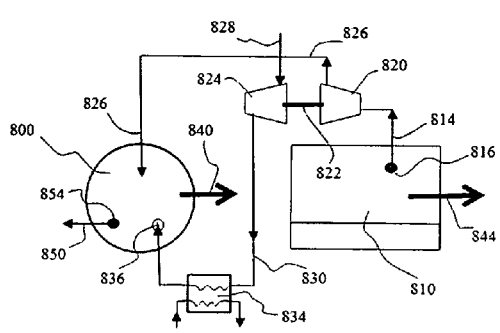
FIG. 35 is an exemplary illustration of a heat engine with or without an over expansion mechanism, wherein a turbocharger with or without an after cooler is employed to increase the charge pressure at an intake port of the heat engine.

FIG. 35 illustrates a heat engine 800 with an over expansion mechanism according to the present invention and integrated with a turbo-charge technique which may boost the intake pressure and density of the intake working fluid exemplarily for the energy recovery from an exhaust stream of a combustion engine 810. An exhaust flow stream 814 flows out of the combustion engine 810 through an exhaust port 816 into the gas turbine 820 of a turbocharger 822, converting an amount of thermal energy into mechanical work to drive compressor 824 of the turbocharger 822. The exhaust stream 826 exits the gas turbine 820 and flows into the heat engine 800 as a heat source to provide thermal energy to the working fluid of the heat engine 800 through a heat exchanger unit (not shown). Working fluid 828 flows into the compressor 824 and is compressed to a higher pressure as the intake fluid 830 of the heat engine 800. To reduce the temperature and increase the density of the intake fluid 830, an after-cooler 834 may be employed to cool down the temperature of the intake working fluid 830 before it is directed into the heat engine 800 through an intake port 836. The mechanical power 840 generated by the heat engine 800 may be coupled with the mechanical work 844 generated by the combustion engine 810 through a coupling mechanism (not shown) for an on-board power system of a vehicle.

The heat engine 800 as shown in FIG. 35 is of an open-looped configuration with expanded working fluid 850 being directly discharged into the surroundings through discharge port 854. However, the discharged the working fluid may return to the inlet of the compressor 824 to create a closed-loop configuration of the heat engine 800 (not shown). Additionally, a compressor which receives the driving power from the heat engine or the combustion engine may be added to assist the compression of the intake working fluid 828 (not shown).

Figure 36:
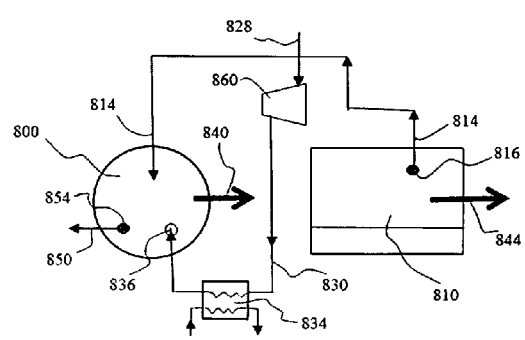
FIG. 36 is an exemplary illustration of a heat engine with or without an over expansion mechanism, wherein a compression means with or without an after cooler is employed to increase the charge pressure at an intake port of the heat engine.

Alternatively, the intake working fluid of the heat engine may be compressed without relying on a turbocharger, as shown in FIG. 36, wherein the intake working fluid 828 is compressed though a compression device 860. The exhaust stream 814 may directly flow into the heat engine 800 as a heat source or after flowing through a turbocharger for compressing the intake fluid of the combustion engine 810 (not shown).

Figure 37:
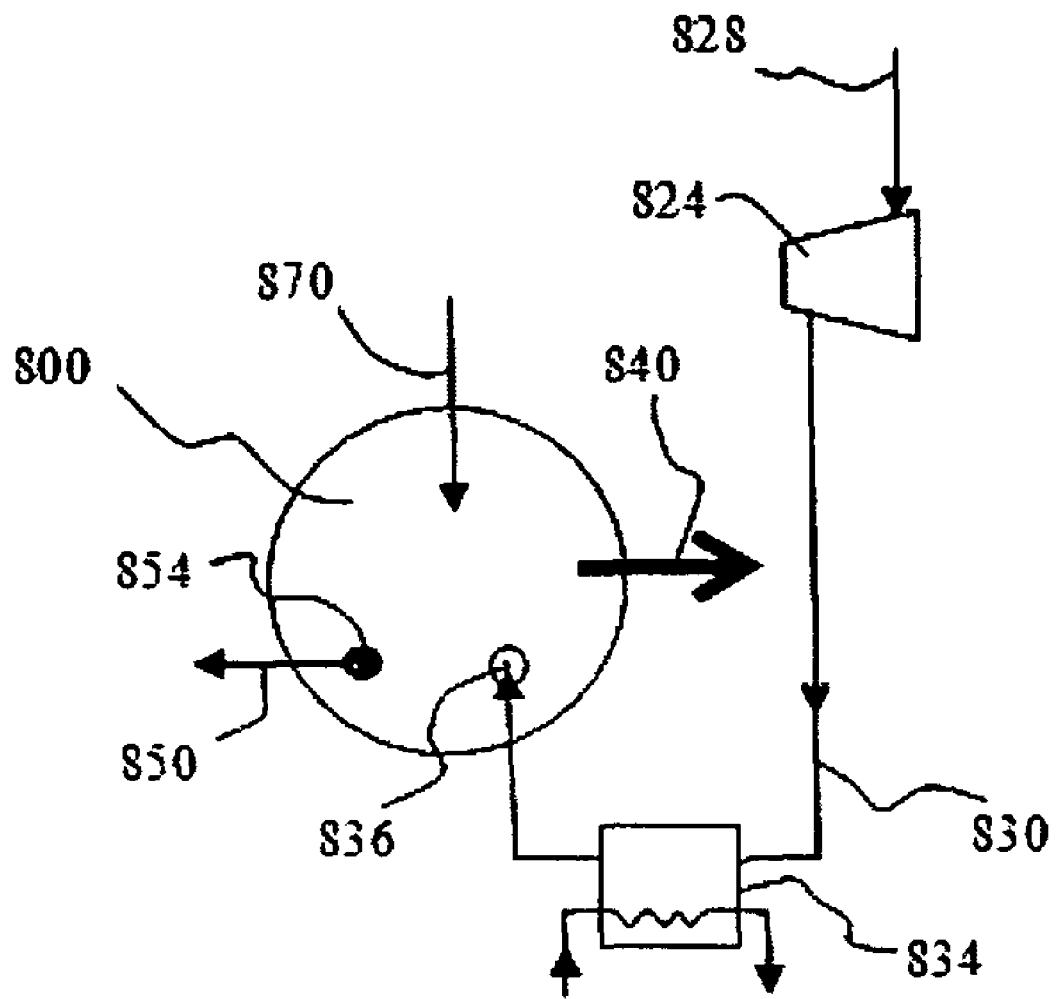
FIG. 37 is an exemplary illustration of a heat engine employing a variety of potential heat sources with or without an over expansion mechanism, wherein a compression means with or without an after cooler is employed to increase the charge density at an intake port of the engine.

Finally, as shown in FIG. 37, the heat source 870 may be a heat source from a variety of potential sources as disclosed without being specified as an exhaust gas stream.

To illustrate the effectiveness of the heat engine 800 in FIGS. 35-37 (or the heat engine 400 in FIGS. 26-27) employing an over expansion cycle (either the Cao cycle or the Miller cycle discussed earlier) with a compression means, a heat engine built upon the structure of a conventional four-stroke combustion engine as shown in FIG. 25 is exemplarily considered. If the ratio of the pressure at the intake port 836 as shown in FIGS. 35-37 to that of 828 is two and the temperature after the after-cooler 834 returns to that of 828, the intake mass of the working fluid may be doubled per intake stroke. If the work developed per unit mass of the working fluid is the same, the power output per intake stroke may be doubled. On the hand, if the number of strokes per intake stroke in the over expansion cycle as disclosed earlier is 50% higher, this indicates that the power output of the heat engine system with a supercharger or turbocharger may be 33% higher that of a heat engine without over expansion, in addition to the benefit of a higher thermal efficiency on the order of 10-30 percent due to the over expansion.

Additionally, the supercharger or turbocharger may accommodate a lower compression ratio of the heat engine, which is critical for harnessing energy from a lower temperature heat source. Since the intake pressure is boosted, the working fluid pressure at the end of the expansion in an over expansion cycle may not be lower than the pressure at the discharge port, so that the benefits of the over expansion cycle may be fully utilized.

The over expansion mechanism is not limited to the Cao cycle (U.S. patent application Ser. No. 11/716,844) and Miller cycle. Another cycle that facilitates the over expansion while maintaining the same number of strokes per intake stroke is disclosed. The cycle to be disclosed herein would feature a hybrid approach of taking in an amount of working fluid through an intake port and retaining an amount of expanded working fluid associated with the expansion stroke. The disclosure herein is in terms of a heat engine constructed based on a four-stroke combustion engine as shown in FIG. 25 and a configuration of four heating chambers per cylinder as shown in FIG. 32. This cycle may include eight strokes as follows:

1. A compression stroke associated with the first and second heating chambers, wherein working fluid is compressed into both the first and second heating chambers while the third and fourth heating chambers are closed, enclosing an amount of working fluid entering the third and fourth heating chambers in the last cycle and the enclosed working fluid is being heated by a heat source.
2. A power stroke for the third heating chamber, wherein working fluid expands from the third heating chamber into cylinder space and delivers work to the piston, while all other heating chamber remain closed and the working fluid entering the first and second heating chambers in the compression stroke mentioned above is being heated by a heat source.
3. A discharge stroke associated with the third heating chamber, wherein expanded working fluid in the cylinder space is discharged out of the cylinder as the piston moves upwardly while other heating chambers remain closed. If the pressure of the working fluid near the bottom dead center is lower than the pressure at the discharge port, the opening of the discharge port may be preferably delayed until the pressure of the working fluid being discharged reaches a level close to that at the discharge port.
4. An expansion stroke associated with the fourth heating chamber, wherein working fluid expands from the fourth heating chamber into the cylinder space and delivers work to the piston, while other heating chambers remain closed. During the expansion stroke when the pressure of the expanding working fluid in the cylinder falls below the pressure at the intake port, working fluid may enter the cylinder through the opening of the intake port for the intake purpose of the cylinder space.
5. A compression stroke associated with the third and fourth heating chambers, wherein working fluid in the cylinder is compressed into both the third and fourth heating chambers while the first and second heating chambers remain closed.
6. A power stroke for the first heating chamber, wherein working fluid expands from the first heating chamber into cylinder space and delivers work to the piston, while all other heating chamber remain closed and the working fluid entering the third and fourth heating chambers in the second compression stroke mentioned above is being heated by a heat source.
7. A discharge stroke associated with the first heating chamber, wherein expanded working in the cylinder space is discharged out of the cylinder as the piston moves upwardly while other heating chambers remain closed. If the pressure of the working fluid near the bottom dead center is lower than the pressure at the discharge port, the opening of the discharge port may be preferably delayed until the pressure of the working fluid being discharged reaches a level close to that at the discharge port.
8. An expansion stroke associated with the second heating chamber, wherein working fluid expands from the second heating chamber into the cylinder space and delivers work to the piston, while the third and fourth heating chambers remain closed. During the expansion stroke when the pressure of the expanding working fluid in the cylinder falls below the pressure at the intake port, working fluid may enter the cylinder space through the opening of the intake port for the intake purpose of the cylinder space. The operation of the heat engine would then return to the compression stroke for both the first and second heating chambers to complete the cycle.

In the above cycle, there are two intake processes associated with the expansion stroke of the fourth heating chamber and the expansion stroke of the second heating chamber. Therefore, the ratio of the total number of strokes in the cycle to the number of intake strokes is four which is the same as that of a heat engine without employing an over expansion mechanism, while the nominal time period for the working fluid to receive heat from the heat source while being enclosed in a heating chamber is at least 720 degrees of crank angle. In the above engine operational cycle, the compression ratio of the first heating chamber having an associated discharge stroke may be preferably greater than that of the second heating chamber which does not have an associated discharge stroke, and the compression ratio of the third heating chamber having an associated discharge stroke may be preferably greater than that of the fourth heating chamber which does not have an associated discharge stroke. These different compression ratios between the first and second heating chambers and between the third and fourth heating chambers may be attained through the early closing of the second heating chamber or fourth heating chamber during the compression stroke or through the employment of a different working fluid volume inside the first heating chamber from that inside the second heating chamber and a different working fluid volume inside the third heating chamber from that inside the fourth heating chamber when being closed.

It should be noted that although the above disclosure is based on the configuration of four heating chambers per cylinder, the spirit of the cycle is equally applicable to a heat engine having two, three, or more than four heating chambers per cylinder. The key features are that at least two heating chambers share a compression stroke and the intake charge being compressed in the compression stroke comprises an amount of intake charge entering the cylinder space through an intake port and an amount of expanded working fluid associated with the expansion stroke just before the compression stroke. However, similar to the disclosure in connection with the heat engine employing the over expansion mechanism of Cao (U.S. patent application Ser. No. 11/716,844), the time periods for an amount of working fluid to receive heat from a heat source while being enclosed in a heating chamber may vary depending on the number of heating chambers per cylinder. Additionally, the cycle disclosed herein is applicable to a heat engine either having an open-cycle configuration or a closed-cycle configuration with or without pressurization. The technique of pre-cooling the intake charge using a refrigeration system or integrating a compression means before the intake port with or without an after cooler may also be employed in conjunction with cycle disclosed herein. It should also be noted that the above disclosure in which two heating chambers share a compression stroke may be extended to the case in which more than two heating chambers share a compression stroke.

Figure 24:
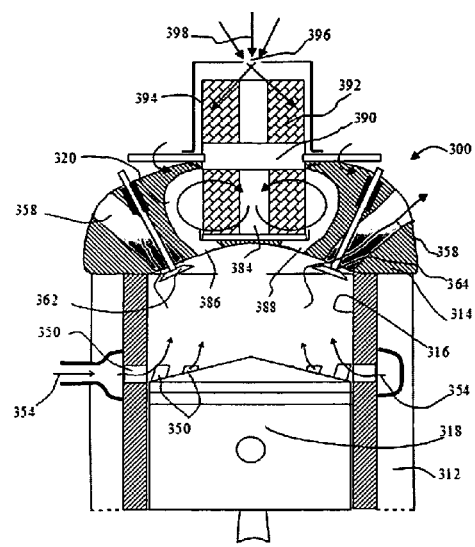
FIG. 24 is a schematic sectional illustration of a heat engine based on the structure of a conventional two-stroke piston-type combustion engine and utilizing a scavenging method with one heating chamber per cylinder, wherein the heating chamber has two opening ports without a heating chamber valve.

It may be emphasized that although the disclosure as shown in FIGS. 35-36 is for energy recovery from a combustion engine with the exhaust gas from the combustion engine as the heat source, the spirit of the invention in connection with the over expansion and intake boosting may be applied to a heat engine 800 with any other heat sources or a heat engine 400 with a closed-cycle configuration. Also, the heat engine 800 or 400 considered herein may be a heat engine based on the structure of a conventional four-stroke piston combustion engine as exemplarily shown in FIG. 25, a heat engine based on the structure of a two-stroke piston engine utilizing a scavenging process as shown in FIG. 23 or FIG. 24, a heat engine based on the structure of a rotary combustion engine as shown in FIGS. 1-9, or a heat engine based on other combustion engine structures not illustrated in this disclosure such as a free piston engine.

Having disclosed the various heat engines in accordance with the present invention and having an expansion ratio greater than the effective compression ratio with or without a compression means for intake working fluid, a refrigerator in accordance with the present invention having an expansion ratio greater than the effective compression ratio with or without a compression means for intake working fluid is logically understandable without the need for an elaborated description of its operational principle herein. The operational principle of such a refrigerator related to the over expansion and intake compression is very similar to that of the heat engine disclosed in this invention. Briefly, the refrigerator unit 500 in FIGS. 28-30 or the refrigerator unit 600 in FIG. 31 may have an expansion ratio greater than the effective compression ratio by employing the principles of Cao's over expansion cycle or Miller cycle. A compression means with or without the after cooler may be employed in the systems as shown in FIG. 28 or FIG. 31 to boost the intake pressure or density of the intake working fluid.

The compression means as mentioned above related to various disclosures for both heat engines and refrigerators may be any suitable type of compressor, which may be, but not limited to, reciprocating compressors, rotary compressors such as Wankel rotary compressor, rolling piston compressor, rotating vane compressor, screw compressor, roots compressor and scroll compressor, or dynamic compressor such as centrifugal compressor and axial flow compressor. When a compressor having a relatively low drive shaft speed is employed, the compressor may share the same drive shaft with the heat engine or refrigerator. Furthermore, one of the rotors in a rotary heat engine or refrigerator may provide a compression means for intake charge or one of the cylinders in a piston heat engine or refrigerator may provide a compression means for the intake charge.

The heat engines disclosed may find numerous applications and some of them are disclosed herein. For the applications wherein the heating fluid is a liquid or two-phase liquid-vapor mixture, said heat exchanger may be a gas-to-liquid or gas-to-two-phase-mixture heat exchanger. One exemplary application is a geothermal power plant wherein the heating fluid of the engine is the hot water or steam from an underground heat source.

Another exemplary application is a solar thermal power plant, wherein the heating fluid, in terms of a single-phase liquid or vapor or vapor-liquid two-phase mixture, receives heat from a solar energy receiver or a plurality of solar energy receivers, and transfers the received heat to the working fluid of the engine through a heat exchanger unit. In the case of vapor as the heating fluid, the vapor in a sub-critical or super-critical thermodynamic state may condense in the heat exchanger unit of the heat engine, releasing the latent heat to the working fluid, and subsequently the condensate return to the solar engine receiver to receive heat in a closed-loop configuration. For both single phase liquid and two-phase mixture, the maximum temperature of the heating fluid entering the heat engine may be limited by the boiling temperature or the saturation pressure of the heating fluid, which may be accommodated by the over expansion mechanism and intake boost.

Yet another exemplary application is a nuclear power plant wherein the heating fluid of the engine may be the coolant of a nuclear reactor in terms of a fluid, a vapor, or two phase liquid-vapor mixture. Said vapor may be in a sub-critical or super-critical thermodynamic state and may be condensed in the heat exchanger unit of the heat engine, releasing the latent heat to the working fluid of the heat engine.

A further exemplary application is a steam power plant, wherein the heating fluid, in terms of a liquid, a vapor or a vapor-liquid two-phase mixture, receives heat from a steam generator such as a boiler, a combustor, or a furnace, and transfers the received heat to the working fluid of the engine. Said vapor in a sub-critical or supercritical thermodynamic state may condense in the heat exchanger unit of the present heat engine, releasing the latent heat to the working fluid of the engine, and subsequently the condensate returns to the steam generator without the use of a steam turbine.

A further exemplary application is related to an external combustion engine or an energy recovery system wherein the heating fluid, in terms of a liquid, vapor, or vapor-liquid two-phase mixture, receives heat from the combustion gas of an external combustion chamber or from the exhaust stream of a combustion engine, such as an internal combustion engine or a gas turbine engine, and transfers the received heat to the working fluid of the heat engine in accordance with the present invention. Said vapor in a sub-critical or supercritical thermodynamic state may condense in the heat exchanger unit, releasing the latent heat to the working fluid of the engine.

A further exemplary application is an energy recovery system, wherein the heating fluid, in terms of a liquid, a vapor, or vapor-liquid two-phase mixture, receives heat from an industrial, transportation, business, or residential process and transfers the received heat to the working fluid of the engine. Said vapor in a sub-critical or supercritical thermodynamic state may condense in the heat exchanger unit of the present heat engine, releasing the latent heat to the working fluid of the engine.

For heat engine applications wherein the heating fluid is a gas, said heat exchanger may be a gas-to-gas heat exchanger. One exemplary application is an energy recovery system wherein the heating fluid is an exhaust stream of a combustion engine, such as an internal combustion engine or a gas turbine engine.

Another exemplary application is an external combustion engine, wherein the heating fluid is the combustion gas from an external combustion chamber, and the present heat engine is the thermal-to-mechanical energy conversion unit of the entire external combustion engine system.

Yet another exemplary application is energy recovery system wherein the heating fluid is a gaseous hot gas from an industrial, business, or residential process.

A further exemplary application is a gaseous closed-loop power plant wherein the heating fluid is a gas flow stream receiving heat exemplarily from a furnace, combustor, or nuclear reactor and transferring the received heat to the working fluid of the heat engine through the heat exchanger unit of the heat engine.

The thermal energy may also be directly transferred from an energy source to the working fluid of the heat engine without an intermediate heating fluid. One exemplary application is a solar thermal energy power plant, wherein one side of the heat exchange unit of the heat engine may directly receive energy from a solar beam and the heat is then transferred to the working fluid of the heat engine.

For many heat engine applications disclosed above, a heating chamber may be equipped with a combustion means such as a spark plug or a fuel injector in conjunction with a fuel line, so that the heat engine may be switched to the operational mode of an international combustion engine for various needs such as startup. For a heat engine equipped with at least two heating chambers per cylinder or per rotor, some of the heating chambers may remain closed during the combustion mode to accommodate a higher compression ratio for combustion. More generally, the heat engine may be modified to form a dual mode engine which may operate in a heat engine mode when the heat from a heat source is available and may be switched to a combustion mode when the heat from the heat source is not available.

On the other hand, the heat engine may be integrated with a combustion engine to form an engine system. More specifically, the heat engine cylinder or rotor may share the same crank shaft or drive shaft with the combustion cylinder or rotor and use the exhaust streams from the combustion cylinder or rotor as the heating fluid.

The disclosed refrigerator in this invention may find many refrigeration related applications that are currently handled by conventional vapor-compression refrigerators. In particular, the refrigerator in accordance with the present invention may use a working fluid, such as air, nitrogen, carbon dioxide, helium, propane or other hydrocarbons, water, or ammonia, which does not have a negative impact on the environment as did for most of the refrigerants used in conventional vapor-compression refrigerators. As disclosed earlier, the refrigerator may even be employed in a vapor-compression refrigeration system and have the functionalities of a compressor, the heat removal, and an expander.

Additionally, auxiliary pressurizing systems may be employed to add the working fluid into the pressurized heat engine or refrigerator system when the leakage of the working fluid out of the system unavoidably occurs.

One skilled in the art may recognize that many above descriptions on the various cycles for both heat engines and refrigerators are based on representative or ideal conditions. However, like prior arts in this field, the general description does not exclude common practices under practical operational considerations. For instance, when it is stated that a first heating chamber is open and a second heating chamber is closed in a compression stroke associated with the first heating chamber, it does not exclude an earlier closing of the first heating chamber before the top dead center and an earlier opening of the second heating chamber for the power stroke associated with the second heating chamber that will follow. Similarly, the common practices of variable valve timing and lift as well as valve overlap periods will be still applicable to the operation of the valves in the present invention. Therefore, in the context of the heating-chamber or cooling-chamber valves, early/late opening or early/late closing as well as valve overlap periods may be common practices, and in connection with the heating-chamber or cooling-chamber valves, early/late opening or early/late closing of a heating chamber or cooling chamber may also be common practices according to the present invention.

What is claimed is:

1. A rotary heat engine comprising:
an outer body with its inner surface defining an engine cavity, at least a rotor being surrounded by said inner surface of the outer body and being defined by a plurality of rotor faces converging to a plurality of angularly spaced rotor tips, said tips engaging the inner surface of said outer body during the operation of the engine and dividing the space formed between said inner surface of the outer body and said rotor faces into a plurality of working chambers, an eccentric drive shaft having an offset lobe and passing through an inner surface of said rotor, at least an intake port and a discharge port, and at least a heating chamber associated with each rotor, said heating chamber having a heat exchanger unit being disposed therewithin and at least an opening port leading to said working chamber, thereby in an engine cycle said heating chamber has an associated compression stroke wherein an amount of working fluid is compressed into said heating chamber from a working chamber, a heat transfer process from a heat source to an amount of working fluid within said heating chamber through said heat exchanger, and an expansion stroke wherein an amount of working fluid expands from said heating chamber into a working chamber and delivers work to said rotor.

2. The heat engine as described in claim 1, wherein the number of said heating chamber associated with a rotor is n, where n is an integer being equal to or greater than one, and each said heating chamber has at least a heating-chamber valve which may open or close said port to establish or block the flow of a gaseous working fluid between said heating chamber and working chamber, and wherein during an operational cycle, a time period is available for heat transfer from the heat source to the working fluid while being enclosed within said heating chamber.

3. The heat engine as described in claim 2, wherein at least two heating chambers associated with a rotor share a compression stroke and said heat engine has an expansion ratio greater than the effective compression ratio of the compression stroke.

4. The heat engine as described in claim 1, wherein during an intake stroke said intake port is closed early or closed late to reduce the effective compression ratio of the compression stroke and to attain an expansion ratio greater than the effective compression ratio.

5. The heat engine as described in claim 1, wherein the heat exchanger is a rotary regenerator heat exchanger.

6. The heat engine as described in claim 1, wherein said heat source is a heating fluid and said heating fluid flows serially through the heating chambers associated with said rotor with the heating fluid flowing out of an upstream heating chamber being directed to the inlet of a downstream heating chamber having a greater working fluid volume therewithin than the working fluid volume of said upstream heating chamber, thereby the compression ratios of the compression strokes associated with the heating chambers are sequentially decreased to match a decreased heating fluid temperature in the flow direction of the heating fluid, or wherein said heating fluid flows serially through the rotors associated with said heat engine with the heating fluid flowing out of an upstream rotor being directed to a downstream rotor having an effective working fluid volume within its heating chambers greater than that of said upstream rotor, thereby the effective compression ratios associated with the rotors are sequentially decreased to match a decreased heating fluid temperature in the flow direction of the heating fluid.

7. The heat engine as described in claim 1, wherein the intake working fluid to the engine is pre-cooled before being compressed, said pre-cooling being realized through the cooling of the intake working fluid by a vapor compression refrigeration system, or by a heat driven refrigeration system such as an absorption refrigeration system or an ejector refrigeration system.

8. The heat engine as described in claim 1, wherein the heat transfer between the heat exchanger surface and the working fluid is enhanced through shaping the passage between the working chamber space and the heating chamber so that near the end of a compression stroke, a vigorous flow of the working fluid is set up in the heating chamber or the working fluid rotates rapidly within the heating chamber, or wherein the heat transfer between the heat exchanger surface and the working fluid is enhanced through an agitation means within the heating chamber to create the motion of the working fluid relative to the heat exchanger surface, said agitation means being driven by a mechanism external of or internal of the heating chamber, or being driven by the incoming working fluid to the heating chamber during the compression stroke.

9. The heat engine as described in claim 1, wherein said heat exchanger is a rotary regenerator heat exchanger wherein solar energy is directly transferred to one side of the heat exchanger without employing an intermediate heating fluid, or wherein said heat exchanger is a heat pipe heat exchanger wherein solar energy is directly transferred to one side of the heat exchanger without employing an intermediate heating fluid.

10. The heat engine as described in claim 1, wherein said heat source is the combustion gas from an external combustion chamber and said heat engine is a unit of an external combustion engine system; said heat source is the exhaust gas from a combustion engine such an internal combustion engine or a gas turbine engine, or a flue gas from an industrial process; said heat source is related to solar energy with a fluid being employed to receive energy from a solar receiver and the thermal energy received is transferred from said fluid to the working fluid of the heat engine; said heat source is related to nuclear energy; or said heat source is related to geothermal energy.

11. The heat engine as described in claim 10, wherein said heat source or heating fluid may be in a liquid, vapor, or vapor-liquid two-phase state, and wherein a heating fluid in a liquid, vapor, or vapor-liquid two-phase state is employed to receive heat from a gaseous heat source and transfer the received heat to the working fluid of the heat engine, said vapor being in a sub-critical or supercritical thermodynamic state and condensing in the heat exchanger unit to release the latent heat to the working fluid of the engine.

12. The heat engine as described in claim 1, wherein a combustion means such as a spark plug or fuel injector in conjunction with a fuel line is added to a heating chamber, thereby said heat engine may be switched to the operational mode of an international combustion engine for various needs such as startup or when the thermal energy from the heat source is not available.

* * * * *